(12) United States Patent
Yang et al.

(10) Patent No.: US 11,160,032 B2
(45) Date of Patent: *Oct. 26, 2021

(54) DATA SENDING METHOD, DATA RECEIVING METHOD, TRANSMIT-END DEVICE, AND RECEIVE-END DEVICE

(71) Applicant: Huawei Technologies Co., Ltd., Shenzhen (CN)

(72) Inventors: Yubo Yang, Shanghai (CN); Chao Luo, Shenzhen (CN); Zheng Liu, Shenzhen (CN); Xiaolei Tie, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/725,317

(22) Filed: Dec. 23, 2019

(65) Prior Publication Data
US 2020/0213951 A1 Jul. 2, 2020

Related U.S. Application Data

(63) Continuation of application No. 16/132,245, filed on Sep. 14, 2018, now Pat. No. 10,536,907, which is a (Continued)

(30) Foreign Application Priority Data

Mar. 16, 2016 (CN) .......................... 201610158478.6

(51) Int. Cl.
*H04W 52/10* (2009.01)
*H04W 52/24* (2009.01)
(Continued)

(52) U.S. Cl.
CPC .............. *H04W 52/24* (2013.01); *H04L 1/06* (2013.01); *H04L 5/0007* (2013.01); *H04L 27/26* (2013.01);
(Continued)

(58) Field of Classification Search
CPC ..... H04W 52/10; H04W 52/24; H04W 52/26; H04W 52/262; H04W 72/0446; H04L 1/06; H04L 5/0007; H04L 27/26
(Continued)

(56) References Cited

U.S. PATENT DOCUMENTS 4,752,939 A * 6/1988 Amoroso ............... H04B 1/713
375/134
6,240,125 B1 * 5/2001 Andersson ............. H04B 1/715
375/132
(Continued)

FOREIGN PATENT DOCUMENTS

CN 1706114 A 12/2005
CN 101189824 A 5/2008
(Continued)

OTHER PUBLICATIONS

ZTE "UL power control for NB-IoT," R1-160059, 3GPP TSG RAN WG1 NB-IoT Ad-Hoc Meeting, Budapest, Hungary, Jan. 18-20, 2016, 5 pages.
(Continued)

*Primary Examiner* — Hai V Nguyen
(74) *Attorney, Agent, or Firm* — Conley Rose, P.C.

(57) ABSTRACT

Embodiments of this application provide a data sending method, a data receiving method, a transmit-end device, and a receive-end device. The data sending method provided in the embodiments of this application may include: performing scrambling code initialization to generate a scrambling code; scrambling a data block based on the scrambling code; repeatedly sending the scrambled data block; performing scrambling code initialization to generate a new scrambling code when an interval after previous scrambling code initialization of the data block is greater than or equal to a preset scrambling code initialization parameter threshold; scrambling the data block again based on the generated new
(Continued)

scrambling code; and repeatedly sending the data block scrambled again. The embodiments of this application can improve efficiency of data transmission between a transmit-end device and a receive-end device.

22 Claims, 6 Drawing Sheets

Related U.S. Application Data continuation of application No. PCT/CN2017/076665, filed on Mar. 14, 2017.

(51) Int. Cl.
  *H04L 5/00* (2006.01)
  *H04L 1/06* (2006.01)
  *H04W 52/26* (2009.01)
  *H04L 27/26* (2006.01)
  *H04W 72/04* (2009.01)

(52) U.S. Cl.
  CPC ......... *H04W 52/26* (2013.01); *H04W 52/262* (2013.01); *H04W 72/0446* (2013.01); *H04W 52/10* (2013.01)

(58) Field of Classification Search
  USPC .................................................. 455/522, 69
  See application file for complete search history.

(56) References Cited

U.S. PATENT DOCUMENTS

| | | | | |
|---|---|---|---|---|
| 7,054,375 B2* | 5/2006 | Kannan | H04L 1/0025 | 375/260 |
| 7,352,821 B2* | 4/2008 | Kannan | H04L 1/0025 | 375/260 |
| 7,800,541 B2* | 9/2010 | Moshfeghi | G01C 21/20 | 342/465 |
| 7,933,350 B2* | 4/2011 | Liu | H04L 5/0075 | 375/260 |
| 8,238,496 B1* | 8/2012 | Narasimhan | H04L 25/0232 | 375/346 |
| 8,238,958 B2* | 8/2012 | Bourlas | H04L 1/0009 | 455/522 |
| 8,416,759 B1* | 4/2013 | Narasimhan | H04W 56/0035 | 370/344 |
| 8,442,449 B2* | 5/2013 | Hui | H04B 7/0658 | 455/69 |
| 8,649,418 B1* | 2/2014 | Negus | H04B 7/0486 | 375/211 |
| 8,675,605 B2* | 3/2014 | Charbit | H04B 1/713 | 370/331 |
| 8,848,686 B1* | 9/2014 | Cheng | H04L 25/0204 | 370/350 |
| 8,897,118 B1* | 11/2014 | Cheng | H04W 56/0035 | 370/203 |
| 8,903,328 B2* | 12/2014 | Ko | H04B 7/0417 | 455/69 |
| 9,307,414 B2* | 4/2016 | Smadi | H04W 72/1215 | |
| 9,370,021 B2* | 6/2016 | Love | H04W 74/006 | |
| 9,398,511 B2* | 7/2016 | Zhang | H04W 36/36 | |
| 9,497,671 B2* | 11/2016 | Wang | H04J 11/0069 | |
| 9,723,634 B2* | 8/2017 | Lin | H04W 74/004 | |
| 9,750,026 B1* | 8/2017 | Saxena | H04W 72/048 | |
| 9,949,263 B2* | 4/2018 | Li | H04W 72/0413 | |
| 10,172,163 B2* | 1/2019 | Lin | H04W 74/0833 | |
| 10,187,878 B2* | 1/2019 | Lin | H04W 72/14 | |
| 10,284,256 B2* | 5/2019 | Zhou | H04L 5/143 | |
| 10,285,170 B2* | 5/2019 | Nam | H04L 5/0057 | |
| 10,383,151 B2* | 8/2019 | Chatterjee | H04W 74/0833 | |
| 10,531,459 B2* | 1/2020 | Yerramalli | H04L 27/2634 | |
| 10,536,907 B2* | 1/2020 | Yang | H04L 1/06 | |
| 10,582,493 B2* | 3/2020 | Park | H04L 27/2646 | |
| 2002/0122499 A1* | 9/2002 | Kannan | H04L 5/0044 | 375/260 |
| 2003/0189893 A1* | 10/2003 | Richardson | H04L 27/2613 | 370/208 |
| 2004/0104923 A1* | 6/2004 | Koyama | H04N 9/67 | 345/697 |
| 2004/0141566 A1* | 7/2004 | Kim | H04L 5/006 | 375/267 |
| 2004/0203476 A1* | 10/2004 | Liu | H04L 1/0029 | 455/69 |
| 2005/0047517 A1* | 3/2005 | Georgios | H04B 7/0626 | 375/267 |
| 2005/0163245 A1 | 7/2005 | Sandell | | |
| 2006/0109925 A1* | 5/2006 | Kannan | H04L 5/0044 | 375/260 |
| 2006/0120469 A1* | 6/2006 | Maltsev | H04L 27/2637 | 375/260 |
| 2006/0183287 A1* | 8/2006 | Collins | H04L 1/0041 | 438/278 |
| 2006/0291577 A1* | 12/2006 | Boariu | H04L 27/2613 | 375/260 |
| 2007/0087749 A1* | 4/2007 | Ionescu | H04L 5/0048 | 455/436 |
| 2007/0177732 A1 | 8/2007 | Schotten et al. | | |
| 2007/0237068 A1* | 10/2007 | Bi | H04L 5/0048 | 370/208 |
| 2008/0151804 A1* | 6/2008 | Wang | H04B 7/0689 | 370/312 |
| 2009/0041104 A1* | 2/2009 | Bogdan | H04L 27/2662 | 375/226 |
| 2009/0046693 A1 | 2/2009 | Nory et al. | | |
| 2009/0110087 A1* | 4/2009 | Liu | H04L 5/0094 | 375/260 |
| 2009/0201794 A1 | 8/2009 | Luo et al. | | |
| 2009/0243932 A1* | 10/2009 | Moshfeghi | G01S 13/38 | 342/378 |
| 2009/0258665 A1* | 10/2009 | Bourlas | H04L 1/0003 | 455/522 |
| 2010/0029289 A1* | 2/2010 | Love | H04L 5/0041 | 455/450 |
| 2010/0086083 A1* | 4/2010 | Ido | H04L 27/265 | 375/340 |
| 2010/0260114 A1* | 10/2010 | Vermani | H04L 5/0055 | 370/329 |
| 2011/0149929 A1* | 6/2011 | Kleider | H04L 27/2613 | 370/338 |
| 2012/0008707 A1 | 1/2012 | Kim et al. | | |
| 2012/0099632 A1* | 4/2012 | Bury | H04J 11/0079 | 375/224 |
| 2012/0115427 A1* | 5/2012 | Hui | H04B 7/0417 | 455/226.1 |
| 2012/0269142 A1* | 10/2012 | Porat | H04L 27/2618 | 370/329 |
| 2013/0040675 A1 | 2/2013 | Anto et al. | | |
| 2013/0051484 A1* | 2/2013 | Kim | H04L 5/0053 | 375/260 |
| 2013/0070869 A1* | 3/2013 | Motamed | H04L 25/0212 | 375/295 |
| 2013/0083753 A1* | 4/2013 | Lee | H04L 1/1858 | 370/329 |
| 2013/0143502 A1* | 6/2013 | Kazmi | H04W 88/06 | 455/62 |
| 2013/0242730 A1* | 9/2013 | Pelletier | H04W 28/0284 | 370/230 |
| 2013/0295989 A1* | 11/2013 | Smadi | H04W 72/1215 | 455/553.1 |
| 2013/0315323 A1* | 11/2013 | Porat | H04L 5/0048 | 375/260 |
| 2014/0044202 A1* | 2/2014 | Hui | H04L 27/32 | 375/260 |
| 2014/0086085 A1 | 3/2014 | Zheng et al. | | |
| 2014/0206358 A1* | 7/2014 | Zhang | H04W 36/36 | 455/437 |
| 2015/0201356 A1* | 7/2015 | Wang | H04W 48/10 | 370/331 |

(56) References Cited

U.S. PATENT DOCUMENTS

| | | | |
|---|---|---|---|
| 2015/0304943 A1* | 10/2015 | Fong | H04W 48/16 |
| | | | 370/329 |
| 2015/0312078 A1* | 10/2015 | Bogdan | H03L 7/00 |
| | | | 375/226 |
| 2016/0007350 A1* | 1/2016 | Xiong | H04W 24/10 |
| | | | 370/252 |
| 2016/0028452 A1* | 1/2016 | Chu | H04L 5/0055 |
| | | | 375/267 |
| 2016/0127160 A1* | 5/2016 | Muhammad | H04L 27/0014 |
| | | | 375/260 |
| 2016/0165574 A1* | 6/2016 | Chu | H04W 72/0413 |
| | | | 370/312 |
| 2016/0249358 A1* | 8/2016 | Li | H04L 5/0073 |
| 2016/0302185 A1* | 10/2016 | Sun | H04W 72/0413 |
| 2016/0309380 A1* | 10/2016 | Zhang | H04W 36/36 |
| 2016/0329998 A1* | 11/2016 | Li | H04L 5/005 |
| 2016/0353443 A1* | 12/2016 | Desai | H04L 5/1469 |
| 2017/0006637 A1* | 1/2017 | Sahlin | H04W 74/006 |
| 2017/0094655 A1* | 3/2017 | Dai | H04L 5/14 |
| 2017/0094689 A1* | 3/2017 | Lin | H04L 27/2613 |
| 2017/0134540 A1* | 5/2017 | Yang | H04L 5/0053 |
| 2017/0187563 A1* | 6/2017 | Shin | H04L 27/2656 |
| 2017/0208568 A1* | 7/2017 | Nam | H04L 5/0094 |
| 2017/0230979 A1* | 8/2017 | Saxena | H04W 76/27 |
| 2017/0237465 A1* | 8/2017 | Zhou | H04L 5/1438 |
| | | | 379/93.08 |
| 2017/0244531 A1* | 8/2017 | Chu | H04L 1/1614 |
| 2017/0273079 A1* | 9/2017 | Park | H04L 5/0094 |
| 2017/0311326 A1* | 10/2017 | Wong | H04W 72/0453 |
| 2017/0311356 A1* | 10/2017 | Lin | H04L 27/2613 |
| 2018/0007673 A1* | 1/2018 | Fwu | H04L 5/0092 |
| 2018/0020360 A1* | 1/2018 | Yerramalli | H04L 5/001 |
| 2018/0020452 A1* | 1/2018 | Yerramalli | H04W 56/0015 |
| 2018/0034618 A1* | 2/2018 | Al Rawi | H04B 3/50 |
| 2018/0062700 A1* | 3/2018 | Al Rawi | H04B 3/32 |
| 2018/0098298 A1* | 4/2018 | Jung | H04L 5/0048 |
| 2018/0145802 A1* | 5/2018 | Hwang | H04W 72/04 |
| 2018/0146498 A1* | 5/2018 | Sahlin | H04W 56/0005 |
| 2018/0206271 A1* | 7/2018 | Chatterjee | H04L 5/0053 |
| 2018/0249509 A1* | 8/2018 | Yi | H04W 48/16 |
| 2018/0254882 A1* | 9/2018 | Bogdan | H03L 7/0995 |
| 2018/0287845 A1* | 10/2018 | Kim | H04L 27/2666 |
| 2018/0287846 A1* | 10/2018 | Kim | H04L 27/2666 |
| 2018/0316532 A1* | 11/2018 | Tie | H04L 27/2607 |
| 2018/0317180 A1* | 11/2018 | Li | H04W 52/242 |
| 2018/0317182 A1* | 11/2018 | Yang | H04W 76/10 |
| 2018/0367285 A1* | 12/2018 | Yi | H04L 1/18 |
| 2018/0376524 A1* | 12/2018 | Lee | H04W 76/27 |
| 2019/0021109 A1* | 1/2019 | Yi | H04L 1/1812 |
| 2019/0037591 A1* | 1/2019 | Lee | H04L 1/1812 |
| 2019/0044782 A1* | 2/2019 | Zeng | H04W 72/0413 |
| 2019/0045452 A1* | 2/2019 | Yang | H04W 52/26 |
| 2019/0059086 A1* | 2/2019 | Saxena | H04W 72/048 |
| 2019/0104477 A1* | 4/2019 | MolavianJazi | H04B 7/088 |
| 2019/0149638 A1* | 5/2019 | Desai | H04L 69/22 |
| | | | 370/329 |
| 2019/0158141 A1* | 5/2019 | Strobel | H04L 1/0001 |
| 2019/0159136 A1* | 5/2019 | MolavianJazi | H04W 72/1284 |
| 2019/0159138 A1* | 5/2019 | Lee | H04W 52/146 |

FOREIGN PATENT DOCUMENTS

| | | |
|---|---|---|
| CN | 101785348 A | 7/2010 |
| CN | 101939961 A | 1/2011 |
| CN | 102638436 A | 8/2012 |
| CN | 103858493 A | 6/2014 |
| CN | 104618291 A | 5/2015 |
| CN | 104885539 A | 9/2015 |
| WO | 2010123190 A1 | 10/2010 |
| WO | 2014014394 A1 | 1/2014 |

OTHER PUBLICATIONS

Vodafone, "Updated SID on: Provision of low-cost MTC UEs based on LTE," RP-121441, TSG RAN meeting #57, Chicago, USA, Sep. 4-7, 2012, 6 pages.

Huawei, et al., "TS 36.300 Section 5 for NB-IoT up to RAN1#84," R1-161554, 3GPP TSG RAN WG1 Meeting #84, St. Julian's, Malta, Feb. 15-19, 2016, 16 pages.

Vodafone Group PLC., "New Study Item on Cellular System Support for Ultra Low Complexity and Low Throughput Internet of Things," GP-140421, 3GPP TSG-GERAN, Meeting #62, Valencia, Spain, May 26-30, 2014, 6 pages.

QUALCOMM Incorporated, "New Work Item: NarrowBand IOT (NB-IOT)," R1-151621, 3GPP TSG RAN Meeting #69, Phoenix, USA, Sep. 14-16, 2015, 8 pages.

3GPP TS 36.211 V13.0.0 (Dec. 2015), 3rd Generation Partnership Project; Technical Specification Group Radio Access Network; Evolved Universal Terrestrial Radio Access (E-UTRA); Physical channels and modulation (Release 13), Dec. 2015, 141 pages.

3GP TS 36.213 V13.0.1 (Jan. 2016), 3rd Generation Partnership Project; Technical Specification Group Radio Access Network; Evolved Universal Terrestrial Radio Access (E-UTRA); Physical layer procedures (Release 13), Jan. 2016, 326 pages.

Keysight Tech, "Discussion on NB-IOT minimum outpower," R5-170136, 3GPP TSG-RAN WG5, Meeting #3-IoT Adhoc, Kochi, India, Jan. 10-13, 2017, 3 pages.

* cited by examiner

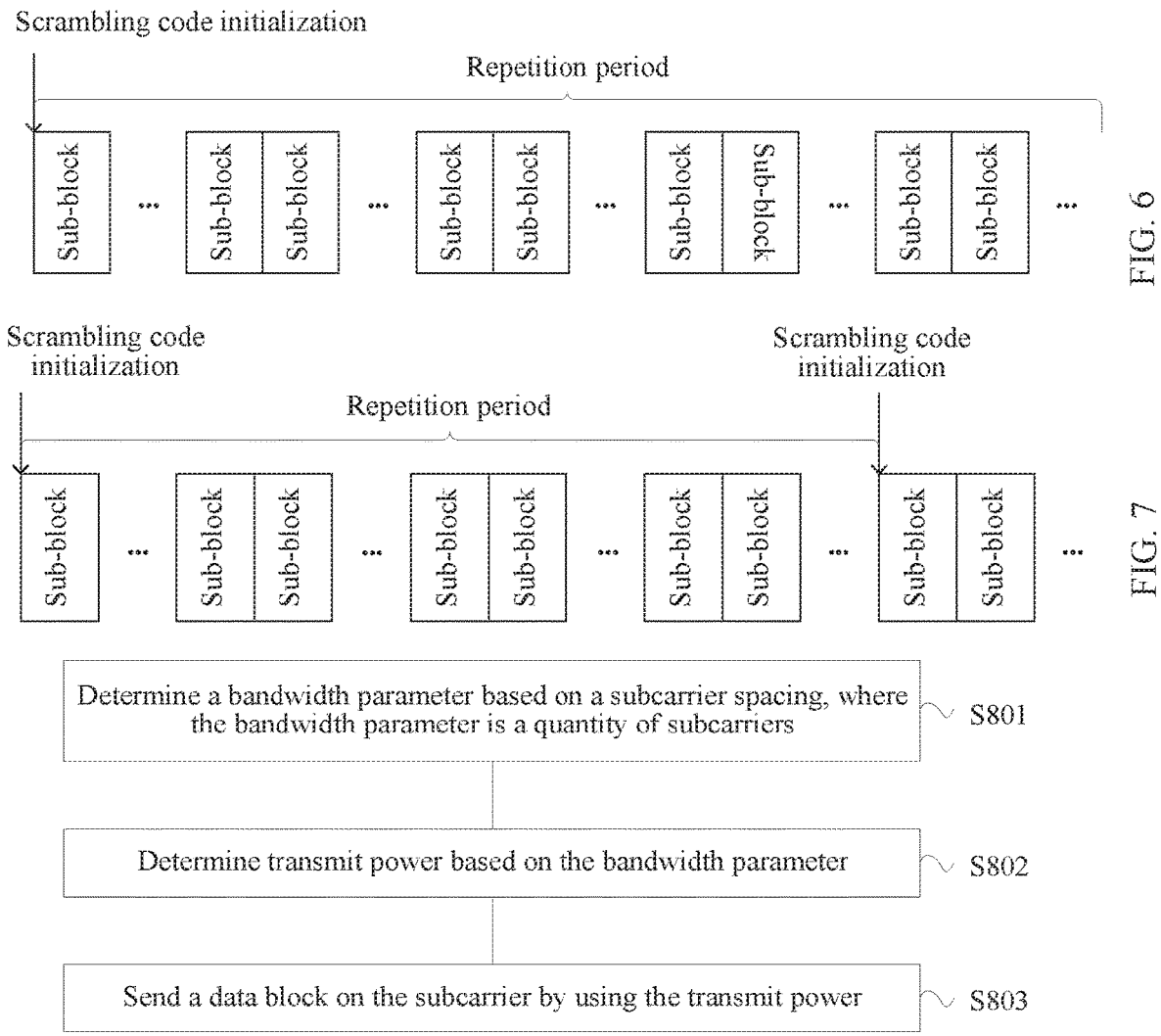

DATA SENDING METHOD, DATA RECEIVING METHOD, TRANSMIT-END DEVICE, AND RECEIVE-END DEVICE

CROSS-REFERENCE TO RELATED APPLICATIONS

This application is a continuation of U.S. patent application Ser. No. 16/132,245, filed on Sep. 14, 2018, which is a continuation of International Application No. PCT/CN2017/076665 filed on Mar. 14, 2017. The International Application claims priority to Chinese Patent Application No. 201610158478.6 filed on Mar. 16, 2016. All of the aforementioned patent applications are hereby incorporated by reference in their entireties.

TECHNICAL FIELD

Embodiments of this application relate to communications technologies, and in particular, to a data sending method, a data receiving method, a transmit-end device, and a receive-end device.

BACKGROUND

As communications technologies develop, communications technologies of Long Term Evolution (LTE) have become increasingly mature, and network coverage of LTE systems also becomes increasingly dense.

In an LTE system, dense network coverage causes interference between neighboring cells. To reduce interference between neighboring cells, scrambling code initialization can be performed, so that a transmit-end device performs scrambling code initialization once in each subframe. Data sent in each subframe has a different scrambling code. The transmit-end device scrambles a data block based on a scrambling code obtained after initialization, and sends the scrambled data block. This can implement interference randomization. To ensure that a receive-end device can receive complete data sent by the transmit-end device, the transmit-end device can repeatedly send the data block, and perform scrambling code initialization once in each subframe.

However, it is difficult for the receive-end device to perform processing such as frequency offset estimation by using the repeatedly sent data block.

SUMMARY

Embodiments of this application provide a data sending method, a data receiving method, a transmit-end device, and a receive-end device, to improve efficiency of data transmission between a transmit-end device and a receive-end device.

An embodiment of this application provides a data sending method, including:
performing scrambling code initialization to generate a scrambling code;
scrambling a data block based on the scrambling code;
repeatedly sending the scrambled data block;
performing scrambling code initialization to generate a new scrambling code when an interval after previous scrambling code initialization of the data block is greater than or equal to a preset scrambling code initialization parameter threshold;
scrambling the data block again based on the generated new scrambling code; and
repeatedly sending the data block scrambled again.

In the data sending method provided in this embodiment of this application, scrambling code initialization may be performed to generate the scrambling code; the data block may be scrambled based on the scrambling code; the scrambled data block may be repeatedly sent; scrambling code initialization may be performed to generate the new scrambling code when the interval after previous scrambling code initialization of the data block is greater than or equal to the scrambling code initialization parameter threshold; the data block may be scrambled based on the generated new scrambling code; and the data block scrambled again may be repeatedly sent. Scrambling code initialization does not need to be performed in each subframe, and is performed when the interval after previous scrambling code initialization of the data block is greater than or equal to the scrambling code initialization parameter threshold. Therefore, scrambling code randomization can be ensured, and the data sending method provided in this embodiment of this application can implement interference randomization. In addition, the previous same scrambling code is used when the interval after previous scrambling code initialization of the data block is less than the scrambling code initialization parameter threshold. Therefore, the data sending method provided in this embodiment of this application can further ensure that the receive-end device can perform processing such as frequency offset estimation by using the repeatedly sent data block, ensure accuracy of data transmission between a transmit-end device and a receive-end device, and improve data transmission efficiency.

Optionally, the interval may be a time interval, and may be indicated by a quantity of time or resource units.

Optionally, the interval is indicated by a quantity of subframes.

Optionally, the data block may occupy at least one subframe, and the performing scrambling code initialization to generate a new scrambling code when an interval after previous scrambling code initialization of the data block is greater than or equal to a scrambling code initialization parameter threshold may include:
if a quantity of subframes occupied by the data block is greater than or equal to the scrambling code initialization parameter threshold, performing scrambling code initialization each time the data block is repeatedly sent, to generate the new scrambling code.

Optionally, the data block occupies at least one subframe, and the performing scrambling code initialization to generate a new scrambling code when an interval after previous scrambling code initialization of the data block is greater than or equal to a scrambling code initialization parameter threshold may include:
if a quantity of subframes occupied by the data block is less than the scrambling code initialization parameter threshold, performing scrambling code initialization to generate the new scrambling code when a quantity of subframes after previous scrambling code initialization is greater than or equal to the scrambling code initialization parameter threshold.

Optionally, the data block is a rate matched block RMB, or a code block corresponding to a redundancy version RV of the RMB, and the RMB is a code block obtained after coding and rate matching are performed on to-be-sent data.

Optionally, the performing scrambling code initialization to generate a scrambling code may include:
performing scrambling code initialization by using the following formula (1):

$$c_{init}=n_{RNTI}\cdot 2^{14}+A\cdot 2^9+N_{ID}^{cell} \quad \text{formula (1)},$$

where $c_{init}$ is a scrambling code, $n_{RNTI}$ is a radio network temporary identifier identifying a terminal. A is a variable value and indicates the ninth to the thirteenth bits of bits that are in ascending order, and $N_{ID}^{cell}$ is a cell identity number.

Optionally, A is obtained by using the following formula (2):

$$A = q\cdot 2^4 + \left\{\left[SFN + \left\lfloor\frac{n_s}{2}\right\rfloor\right]\mathrm{mod}16\right\}, \quad \text{formula (2)}$$

q remains 0 or 1, or is obtained by performing negation on a previous value each time scrambling code initialization is performed; and SFN indicates a system frame number, $n_s$ indicates a number of a corresponding timeslot in which the data block is repeatedly sent currently, $\lfloor\cdot\rfloor$ indicates rounding down, and mod indicates modulo.

Alternatively, A is obtained by using the following formula (3):

$$A = q\cdot 2^4 + \left\{\left[SFN + \left\lfloor\frac{n_s}{2}\right\rfloor + \#Rep\right]\mathrm{mod}16\right\}, \quad \text{formula (3)}$$

where q remains 0 or 1, or is obtained by performing negation on a previous value each time scrambling code initialization is performed; and SFN indicates a system frame number, $n_s$ indicates a number of a corresponding timeslot in which the data block is repeatedly sent currently, $\lfloor\cdot\rfloor$ indicates rounding down, # Rep indicates a repetition sequence number corresponding to current repeated sending of the data block, and mod indicates modulo.

Alternatively, A may be further obtained by using the following formula (4):
where $$A = q\cdot 2^4 + \left\{\left[\left\lfloor\frac{n_s}{2}\right\rfloor + \#Rep\right]\mathrm{mod}16\right\}, \quad \text{formula (4)}$$

q remains 0 or 1, or is obtained by performing negation on a previous value each time scrambling code initialization is performed; and $n_s$ indicates a number of a corresponding timeslot in which the data block is repeatedly sent currently, $\lfloor\cdot\rfloor$ indicates rounding down, # ReP indicates a repetition sequence number corresponding to current repeated sending of the data block, and mod indicates modulo.

Alternatively, A may be further obtained by using the following formula (5):
where $$A = \left[SFN + \left\lfloor\frac{n_s}{2}\right\rfloor\right]\mathrm{mod}32, \quad \text{formula (5)}$$

SFN indicates a system frame number, $n_s$ indicates a number of a corresponding timeslot in which the data block is repeatedly sent currently, $\lfloor\cdot\rfloor$ indicates rounding down, and mod indicates modulo.

Alternatively, A is obtained by using the following formula (6):

$$A = \left[SFN + \left\lfloor\frac{n_s}{2}\right\rfloor + \#Rep\right]\mathrm{mod}32, \quad \text{formula (6)}$$

where

SFN indicates a system frame number, $n_s$ indicates a number of a corresponding timeslot in which the data block is repeatedly sent currently, $\lfloor\cdot\rfloor$ indicates rounding down. # Rep indicates a repetition sequence number corresponding to current repeated sending of the data block, and mod indicates modulo.

Alternatively, A may be further obtained by using the following formula (7):

$$A = \left[\left\lfloor\frac{n_s}{2}\right\rfloor + \#Rep\right]\mathrm{mod}32, \quad \text{formula (7)}$$

where $n_s$ indicates a number of a corresponding timeslot in which the data block is repeatedly sent currently. # Rep indicates a repetition sequence number corresponding to current repeated sending of the data block, $\lfloor\cdot\rfloor$ indicates rounding down, and mod indicates modulo.

The data sending method provided in this embodiment of this application may further provide a plurality of data sending methods for a data block occupying one subframe and a data block occupying a plurality of subframes, so that the data sending method can implement interference randomization when a data block of one subframe or a data block of a plurality of subframes is sent, can further ensure that a receive-end device can perform processing such as frequency offset estimation by using the repeatedly sent data block, ensure accuracy of data transmission between a transmit-end device and a receive-end device, and improve data transmission efficiency. In addition, a plurality of implementations of scrambling code initialization are provided, so that randomization of the scrambling code generated after scrambling code initialization can be better ensured, and randomization of interference between neighboring cells can be better ensured.

An embodiment of this application may further provide a data sending method, including:

performing scrambling code initialization to generate a scrambling code at the beginning of each repetition period of a data block, where a sum of quantities of repetitions in all repetition periods of the data block is equal to a quantity of repetitions required by the data block;

scrambling the data block based on the scrambling code; and repeatedly sending the scrambled data block in each repetition period based on a quantity of repetitions corresponding to the repetition period.

In the data sending method provided in this embodiment of this application, scrambling code initialization is performed to generate the scrambling code at the beginning of each repetition period of the data block, where the sum of the quantities of repetitions in all the repetition periods of the data block is equal to the quantity of repetitions required by the data block, the data block is scrambled based on the scrambling code, and the scrambled data block is repeatedly sent in each repetition period based on the quantity of repetitions corresponding to the repetition period. Because scrambling code initialization does not need to be performed in each subframe, the data sending method provided in this embodiment of this application can further ensure that a receive-end device can perform processing such as frequency offset estimation by using the repeatedly sent data block, ensure accuracy of data transmission between a transmit-end device and a receive-end device, and improve data transmission efficiency while implementing interference randomization.

Optionally, the data block includes a plurality of sub-blocks, and each sub-block corresponds to at least one subframe.

Optionally, the data block is a rate matched block RMB, the RMB is a code block obtained after coding and rate matching are performed on to-be-sent data, and the RMB includes code blocks corresponding to at least two RVs; and each sub-block corresponds to a subframe or a redundancy version RV.

Optionally, all the repetition periods include at least one repetition period.

An embodiment of this application further provides a data sending method, including:

determining a bandwidth parameter based on a subcarrier spacing, where the bandwidth parameter is a quantity of subcarriers;

determining transmit power based on the bandwidth parameter; and sending a data block on the subcarrier by using the transmit power.

Optionally, the determining a bandwidth parameter based on a subcarrier spacing may include:

if the subcarrier spacing is a first spacing, determining a ratio of the first spacing to a second spacing as the bandwidth parameter, where the second spacing is greater than the first spacing; and the sending a data block on the subcarrier by using the transmit power may include:

sending the data block on a single subcarrier of subcarriers between which the subcarrier spacing is the first spacing by using the transmit power.

Optionally, the first spacing is 3.75 kHz, and the second spacing is 15 kHz.

Optionally, the determining a bandwidth parameter based on a subcarrier spacing may include:

if the subcarrier spacing is a second spacing, determining a quantity of subcarriers between which the subcarrier spacing is the second spacing as the bandwidth parameter, and the sending a data block on the subcarrier by using the transmit power may include:

sending the data block on at least one of subcarriers between which the subcarrier spacing is the second spacing by using the transmit power.

Optionally, the second spacing is 15 kHz, and the quantity of subcarriers that are spaced by the second spacing is 1, 3, 6, or 12.

An embodiment of this application further provides a data sending method, including:

determining transmit power based on a preset quantity of repetitions and a preset modulation and coding scheme MCS; and repeatedly sending a data block by using the transmit power and the preset quantity of repetitions.

Optionally, the determining transmit power based on a preset quantity of repetitions and a preset MCS includes:

if a preset quantity of times of repeated sending is greater than or equal to a quantity of repetitions corresponding to the preset MCS, determining maximum transmit power as the transmit power.

Optionally, the determining transmit power based on a preset quantity of repetitions and a preset MCS includes:

determining a bit rate based on a preset quantity of times of repeated sending and the preset MCS; and if the bit rate is less than or is equal to a preset bit rate value, determining maximum transmit power as the transmit power.

An embodiment of this application further provides a data sending method, including:

determining a value of a preset field in a narrow band master information block based on an operation mode of a first cell; and sending the narrow band master information block.

Optionally, the determining a value of a preset field in a narrow band master information block based on an operation mode of a first cell includes:

if the operation mode of the first cell is a standalone operation mode, configuring the value of the preset field to a first value; or if the operation mode of the first cell is a guard-band operation mode, configuring the value of the preset field to a second value, where the first value is different from the second value.

Optionally, the determining a value of a preset field in a narrow band master information block based on an operation mode of a first cell may include:

if the operation mode of the first cell is an in-band operation mode, and a quantity of antenna ports of the first cell is the same as a quantity of antenna ports of a second cell, configuring the value of the preset field to a third value.

Optionally, the determining a value of a preset field in a narrow band master information block based on an operation mode of a first cell includes:

if the operation mode of the first cell is an in-band operation mode, and a quantity of antenna ports of the first cell is different from a quantity of antenna ports of a second cell, configuring the value of the preset field to a fourth value.

An embodiment of this application further provides a data receiving method, including:

receiving a narrow band master information block; and determining an operation mode of a first cell based on a value of a preset field in the narrow band master information block.

Optionally, the determining an operation mode of a first cell based on a value of a preset field in the narrow band master information block includes:

if the value of the preset field is a first value, determining that the operation mode of the first cell is a standalone operation mode; or if the value of the preset field is a second value, determining that the operation mode of the first cell is a guard-band operation mode.

Optionally, the determining an operation mode of a first cell based on a value of a preset field in the narrow band master information block includes:

if the value of the preset field is a third value, and a quantity of antenna ports of the first cell is the same as a quantity of antenna ports of a second cell, determining that the operation mode of the first cell is an in-band operation mode.

Optionally, the determining an operation mode of a first cell based on a value of a preset field in the narrow band master information block includes:

if the value of the preset field is a fourth value, and a quantity of antenna ports of the first cell is different from a quantity of antenna ports of a second cell, determining that the operation mode of the first cell is an in-band operation mode.

An embodiment of this application further provides a transmit-end device, including:

a generation module, configured to perform scrambling code initialization to generate a scrambling code;

a scrambling module, configured to scramble a data block based on the scrambling code; and a sending module, configured to repeatedly send the scrambled data block, where the generation module is further configured to perform scrambling code initialization to generate a new scrambling code when an interval after previous scrambling code initialization of the data block is greater than or equal to a preset scrambling code initialization parameter threshold:

the scrambling module is further configured to scramble the data block again based on the generated new scrambling code; and the sending module is further configured to repeatedly send the data block scrambled again.

Optionally, the interval is indicated by a quantity of time or resource units.

Optionally, the interval is indicated by a quantity of subframes.

Optionally, the data block occupies at least one subframe, and the generation module is further configured to: if a quantity of subframes occupied by the data block is greater than or equal to the scrambling code initialization parameter threshold, perform scrambling code initialization each time the data block is repeatedly sent, to generate the new scrambling code.

Optionally, the data block occupies at least one subframe, and the generation module is further configured to: if a quantity of subframes occupied by the data block is less than the scrambling code initialization parameter threshold, perform scrambling code initialization to generate the new scrambling code when a quantity of subframes after previous scrambling code initialization is greater than or equal to the scrambling code initialization parameter threshold.

Optionally, the data block is a rate matched block RMB, or a code block corresponding to a redundancy version RV of the RMB, and the RMB is a code block obtained after coding and rate matching are performed on to-be-sent data.

Optionally, the generation module is further configured to perform scrambling code initialization by using the following formula (1):

$$c_{init} = n_{RNTI} \cdot 2^{14} + A \cdot 2^9 + N_{ID}^{cell} \quad \text{formula (1),}$$

where $c_{init}$ is a scrambling code, $n_{RNTI}$ is a radio network temporary identifier identifying a terminal, A is a variable value and indicates the ninth to the thirteenth bits of bits that are in ascending order, and $N_{ID}^{cell}$ is a cell identity number.

Optionally, the generation module may be configured to obtain A by using the following formula (2):

$$A = q \cdot 2^4 + \{[SFN + \lfloor \tfrac{n_s}{2} \rfloor] \bmod 16\}, \quad \text{formula (2)}$$

where q remains 0 or 1, or is obtained by performing negation on a previous value each time scrambling code initialization is performed, and SFN indicates a system frame number, $n_s$ indicates a number of a corresponding timeslot in which the data block is repeatedly sent currently, $\lfloor \cdot \rfloor$ indicates rounding down, and mod indicates modulo.

Alternatively, the generation module is further configured to obtain A by using the following formula (3):
where $$A = q \cdot 2^4 + \{[[SFN + \lfloor \tfrac{n_s}{2} \rfloor] + \#Rep] \bmod 16\}, \quad \text{formula (3)}$$

q remains 0 or 1, or is obtained by performing negation on a previous value each time scrambling code initialization is performed; and SFN indicates a system frame number, $n_s$ indicates a number of a corresponding timeslot in which the data block is repeatedly sent currently, $\lfloor \cdot \rfloor$ indicates rounding down, # Rep indicates a repetition sequence number corresponding to current repeated sending of the data block, and mod indicates modulo.

Alternatively, the generation module is further configured to obtain A by using the following formula (4):

$$A = q \cdot 2^4 + \{[\lfloor \tfrac{n_s}{2} \rfloor + \#Rep] \bmod 16\}, \quad \text{formula (4)}$$

where q remains 0 or 1, or is obtained by performing negation on a previous value each time scrambling code initialization is performed; and $n_s$ indicates a number of a corresponding timeslot in which the data block is repeatedly sent currently, $\lfloor \cdot \rfloor$ indicates rounding down, # Rep indicates a repetition sequence number corresponding to current repeated sending of the data block, and mod indicates modulo.

Alternatively, the generation module is further configured to obtain A by using the following formula (5):

$$A = [SFN + \lfloor \tfrac{n_s}{2} \rfloor] \bmod 32, \quad \text{formula (5)}$$

where

SFN indicates a system frame number, $n_s$ indicates a number of a corresponding timeslot in which the data block is repeatedly sent currently, $\lfloor \cdot \rfloor$ indicates rounding down, and mod indicates modulo.

Alternatively, the generation module is further configured to obtain A by using the following formula (6):

$$A = [SFN + \lfloor \tfrac{n_s}{2} \rfloor + \#Rep] \bmod 32, \quad \text{formula (6)}$$

where

SFN indicates a system frame number, $n_s$ indicates a number of a corresponding timeslot in which the data block is repeatedly sent currently, $\lfloor \cdot \rfloor$ indicates rounding down, #

Rep indicates a repetition sequence number corresponding to current repeated sending of the data block, and mod indicates modulo.

Alternatively, the generation module is further configured to obtain A by using the following formula (7):

$$A = \left[\left\lfloor \frac{n_s}{2} \right\rfloor + \#Rep\right] \mod 32, \quad \text{formula (7)}$$

where $n_s$ indicates a number of a corresponding timeslot in which the data block is repeatedly sent currently, # Rep indicates a repetition sequence number corresponding to current repeated sending of the data block, $\lfloor \cdot \rfloor$ indicates rounding down, and mod indicates modulo.

An embodiment of this application may further provide a transmit-end device, including:

a generation module, configured to perform scrambling code initialization to generate a scrambling code at the beginning of each repetition period of a data block, where a sum of quantities of repetitions in all repetition periods of the data block is equal to a quantity of repetitions required by the data block;

a scrambling module, configured to scramble a data block based on the scrambling code; and a sending module, configured to repeatedly send the scrambled data block in each repetition period based on a quantity of repetitions corresponding to the repetition period.

Optionally, the data block includes a plurality of sub-blocks, and each sub-block corresponds to at least one subframe.

Optionally, the data block is a rate matched block RMB, the RMB is a code block obtained after coding and rate matching are performed on to-be-sent data, and the RMB includes code blocks corresponding to at least two RVs; and each sub-block corresponds to a subframe or a redundancy version RV.

Optionally, all the repetition periods include at least one repetition period.

An embodiment of this application further provides a transmit-end device, including:

a determining module, configured to: determine a bandwidth parameter based on a subcarrier spacing, where the bandwidth parameter is a quantity of subcarriers, and determine transmit power based on the bandwidth parameter; and a sending module, configured to send a data block on the subcarrier by using the transmit power.

Optionally, the determining module is further configured to: if the subcarrier spacing is a first spacing, determine a ratio of the first spacing to a second spacing as the bandwidth parameter, where the second spacing is greater than the first spacing; and the sending module is further configured to send the data block on a single subcarrier of subcarriers between which the subcarrier spacing is the first spacing by using the transmit power.

Optionally, the first spacing is 3.75 kHz, and the second spacing is 15 kHz.

Optionally, the determining module is further configured to: if the subcarrier spacing is a second spacing, determine a quantity of subcarriers between which the subcarrier spacing is the second spacing as the bandwidth parameter; and the sending module is further configured to send the data block on at least one of subcarriers between which the subcarrier spacing is the second spacing by using the transmit power.

Optionally, the second spacing is 15 kHz, and the quantity of subcarriers that are spaced by the second spacing is 1, 3, 6, or 12.

An embodiment of this application further provides a transmit-end device, including:

a determining module, configured to determine transmit power based on a preset quantity of repetitions and a preset modulation and coding scheme MCS; and a sending module, configured to repeatedly send a data block by using the transmit power and the preset quantity of repetitions.

Optionally, the determining module is further configured to: if a preset quantity of times of repeated sending is greater than or equal to a quantity of repetitions corresponding to the preset MCS, determine maximum transmit power as the transmit power.

Optionally, the determining module is further configured to: determine a bit rate based on a preset quantity of times of repeated sending and the preset MCS; and if the bit rate is less than or is equal to a preset bit rate value, determine maximum transmit power as the transmit power.

An embodiment of this application further provides a transmit-end device, including:

a determining module, configured to determine a value of a preset field in a narrow band master information block based on an operation mode of a first cell; and a sending module, configured to send the narrow band master information block.

Optionally, the determining module is further configured to: if the operation mode of the first cell is a standalone operation mode, configure the value of the preset field to a first value; or if the operation mode of the first cell is a guard-band operation mode, configure the value of the preset field to a second value, where the first value is different from the second value.

Optionally, the determining module is further configured to: if the operation mode of the first cell is an in-band operation mode, and a quantity of antenna ports of the first cell is the same as a quantity of antenna ports of a second cell, configure the value of the preset field to a third value.

Optionally, the determining module is further configured to: if the operation mode of the first cell is an in-band operation mode, and a quantity of antenna ports of the first cell is different from a quantity of antenna ports of a second cell, configure the value of the preset field to a fourth value.

An embodiment of this application further provides a data receiving method, including:

a receiving module, configured to receive a narrow band master information block; and a determining module, configured to determine an operation mode of a first cell based on a value of a preset field in the narrow band master information block.

Optionally, the determining module is further configured to: if the value of the preset field is a first value, determine that the operation mode of the first cell is a standalone operation mode; or if the value of the preset field is a second value, determine that the operation mode of the first cell is a guard-band operation mode.

Optionally, the determining module is further configured to: if the value of the preset field is a third value, and a quantity of antenna ports of the first cell is the same as a quantity of antenna ports of a second cell, determine that the operation mode of the first cell is an in-band operation mode.

Optionally, the determining module is further configured to: if the value of the preset field is a fourth value, and a quantity of antenna ports of the first cell is different from a quantity of antenna ports of a second cell, determine that the operation mode of the first cell is an in-band operation mode.

In the data sending method, the data receiving method, the transmit-end device, and the receive-end device provided in the embodiments of this application, scrambling code initialization is performed to generate the scrambling code; the data block is scrambled based on the scrambling code; the scrambled data block is repeatedly sent; scrambling code initialization is performed to generate the new scrambling code when the interval after previous scrambling code initialization of the data block is greater than or equal to the scrambling code initialization parameter threshold; the data block is scrambled based on the generated new scrambling code; and the data block scrambled again is repeatedly sent. Scrambling code initialization does not need to be performed in each subframe, and is performed when the interval after previous scrambling code initialization of the data block is greater than or equal to the scrambling code initialization parameter threshold. Therefore, scrambling code randomization can be ensured, and the data sending method provided in the embodiments of this application can implement interference randomization. In addition, the previous same scrambling code is used when the interval after previous scrambling code initialization of the data block is less than the scrambling code initialization parameter threshold. Therefore, the data sending method provided in the embodiments of this application can further ensure that the receive-end device can perform processing such as frequency offset estimation by using the repeatedly sent data block, ensure accuracy of data transmission between a transmit-end device and a receive-end device, and improve data transmission efficiency.

BRIEF DESCRIPTION OF THE DRAWINGS

FIG. 6 is a schematic diagram of performing scrambling code initialization in a data sending method according to Embodiment 3 of this application;

FIG. 7 is another schematic diagram of performing scrambling code initialization in a data sending method according to Embodiment 3 of this application;

FIG. 8 is a flowchart of a data sending method according to Embodiment 4 of this application;

FIG. 9 is a flowchart of a data sending method according to Embodiment 5 of this application;

DETAILED DESCRIPTION

A data sending method provided in embodiments of this application may be applied to a network system based on an LTE communications technology, that is, an LTE network system. The LTE network system may include, for example, an Internet of Thing (IOT) system. In IOT serving as "Internet of object-to-object communication", information may be exchanged and communicated between objects. This communication manner may also be referred to as machine type communication (MTC). A terminal in IOT may also be referred to as an MTC terminal. Typical applications of Internet of Thing include smart metering, smart household, and the like. In narrow band Internet of Thing (NB-IOT) of IOT, to ensure that a receive-end device can accurately receive a complete data block, data is repeatedly sent.

It should be noted that data sending methods provided in the embodiments of this application are not limited to usage in the scenarios described above, and may be further used in any other scenarios of repeated data transmission between a transmit-end device and a receive-end device.

All the data sending methods provided in the embodiments of this application may be performed by a transmit-end device. The transmit-end device may be a terminal or a network device such as a base station. If the transmit-end device is a terminal, the data sending methods may be used for uplink data transmission. If the transmit-end device is a network device, the data sending method may be further used for downlink data transmission. In other words, the data sending methods may be applied to both uplink data transmission and downlink data transmission.

Figure 1:
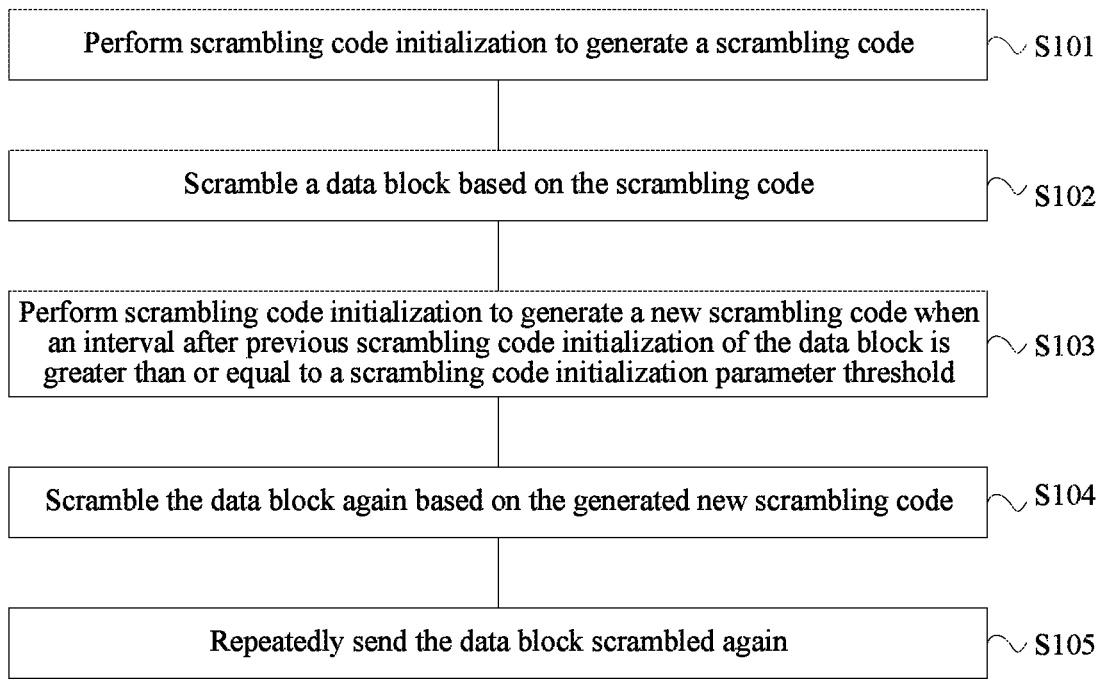
FIG. 1 is a flowchart of a data sending method according to Embodiment 1 of this application.

FIG. 1 is a flowchart of a data sending method according to Embodiment 1 of this application. As shown in FIG. 1, the method may include the following steps.

S101: Perform scrambling code initialization to generate a scrambling code.

Specifically, a different scrambling code is generated each time scrambling code initialization is performed, to implement randomization of a scrambling code of a current moment and a scrambling code of a previous moment. In S101, scrambling code initialization may be performed before a data block is sent for the first time, or scrambling code initialization may be performed at another moment.

In S101, scrambling code initialization may be performed by using an initialization formula corresponding to a preset sequence generator. The preset sequence generator may be, for example, a pseudo-random sequence generator such as a Gold sequence generator, or may be another type of sequence generator.

S102: Scramble a data block based on the scrambling code.

The data block occupies at least one subframe. In S102, the data block may be scrambled based on the scrambling code, so that randomization of information in the data block can be implemented, and randomization of interference with another cell by a cell of the transmit-end device can be implemented in a transmission process of the scrambled data block.

S103: Repeatedly send the scrambled data block.

Specifically, "repeatedly sending" indicates that sending is performed for a plurality of times. To be specific, in S103, the scrambled data block is actually sent for a plurality of times, until an interval after previous scrambling initialization of the data block is greater than or equal to a scrambling code initialization parameter threshold.

S104: Perform scrambling code initialization to generate a new scrambling code when an interval after previous scrambling code initialization of the data block is greater than or equal to a scrambling code initialization parameter threshold.

Specifically, the scrambling code initialization parameter threshold may be a parameter value preconfigured on a side of the transmit-end device in advance, or may be a parameter value configured for a side of the transmit-end device by using signaling. For example, if the transmit-end device is a terminal, the scrambling code initialization parameter threshold may be a value configured by a network device such as a base station by using higher layer signaling or control signaling.

Optionally, the interval may be a time interval, and the time interval may be indicated by a time, a quantity of subframes, a quantity of resource units (Resource Unit), or the like.

S105: Scramble the data block again based on the generated new scrambling code.

Specifically, in S105, the data block may be scrambled by using the implementation similar to that in S102.

S106: Repeatedly send the data block scrambled again.

In the data sending method provided in Embodiment 1 of this application, scrambling code initialization is performed to generate the scrambling code; the data block is scrambled based on the scrambling code; the scrambled data block is repeatedly sent; scrambling code initialization is performed to generate the new scrambling code when the interval after previous scrambling code initialization of the data block is greater than or equal to the scrambling code initialization parameter threshold; the data block is scrambled based on the generated new scrambling code; and the data block scrambled again is repeatedly sent. Scrambling code initialization does not need to be performed in each subframe, and is performed when the interval after previous scrambling code initialization of the data block is greater than or equal to the scrambling code initialization parameter threshold. Therefore, scrambling code randomization can be ensured, and the data sending method provided in this embodiment of this application can implement interference randomization. In addition, the previous same scrambling code is used when the interval after previous scrambling code initialization of the data block is less than the scrambling code initialization parameter threshold. Therefore, the data sending method provided in this embodiment of this application can further ensure that the receive-end device can perform processing such as frequency offset estimation by using the repeatedly sent data block, ensure accuracy of data transmission between a transmit-end device and a receive-end device, and improve data transmission efficiency.

Optionally, if the interval is indicated by a quantity of subframes, the scrambling code initialization parameter threshold may be a preset quantity of subframes.

Optionally, the quantity of subframes corresponding to the interval may include a quantity of valid subframes, or may include a quantity of all subframes. A network system of the transmit-end device and the receive-end device may be a network system based on an LTE communications technology, for example. Internet of Things based on an LTE communications technology. The valid subframe is a subframe of a corresponding frequency band resource of Internet of Things in a system based on an LTE communications technology.

The data block occupies at least one subframe, and the interval may be indicated by a quantity of subframes after previous scrambling code initialization of the data block. A length of the data block may be a quantity of subframes occupied by the data block. If the data block occupies at least one subframe, the length of the data block is the at least one subframe.

For example, the data block may occupy one subframe. To be specific, the data sending method provided in this embodiment of this application may be applied to a case in which the data block occupies one subframe. In a process of repeatedly sending the data block, when the interval after previous scrambling code initialization of the data block is greater than or equal to the scrambling code initialization parameter threshold, scrambling code initialization is performed.

Figure 2:
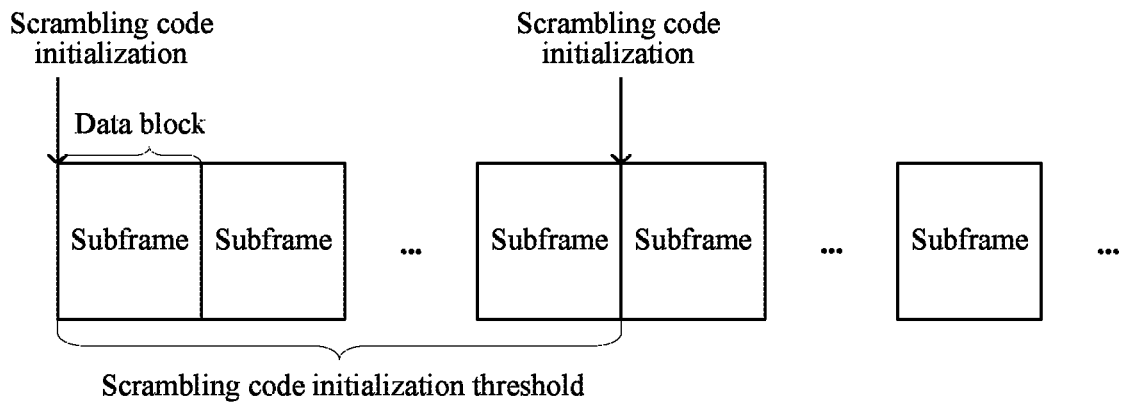
FIG. 2 is a schematic diagram of performing scrambling code initialization when a data block occupies one subframe in a data sending method according to Embodiment 2 of this application.

FIG. 2 is a schematic diagram of performing scrambling code initialization when a data block occupies one subframe in a data sending method according to Embodiment 2 of this application. If the scrambling code initialization parameter threshold is Z, that is, when the interval after previous scrambling code initialization is greater than or equal to Z subframes in the data sending method provided in this embodiment of this application, scrambling code initialization may be performed.

Optionally, the method may further include:

if the interval after previous scrambling code initialization of the data block is less than the scrambling code initialization parameter threshold, only when the data block is transmitted for the first time, performing scrambling code initialization for the data block.

Optionally, the data block may be a code block obtained after coding and rate matching are performed on to-be-sent data. Therefore, the data block may also be referred to as a rate matched block (RMB).

For example, the data block may alternatively occupy a plurality of subframes. To be specific, the data sending method provided in this embodiment of this application may be applied to a case in which the data block occupies a plurality of subframes. In a process of repeatedly sending the data block, when the interval after previous scrambling code initialization of the data block is greater than or equal to the scrambling code initialization parameter threshold, scrambling code initialization is performed.

Figure 3:
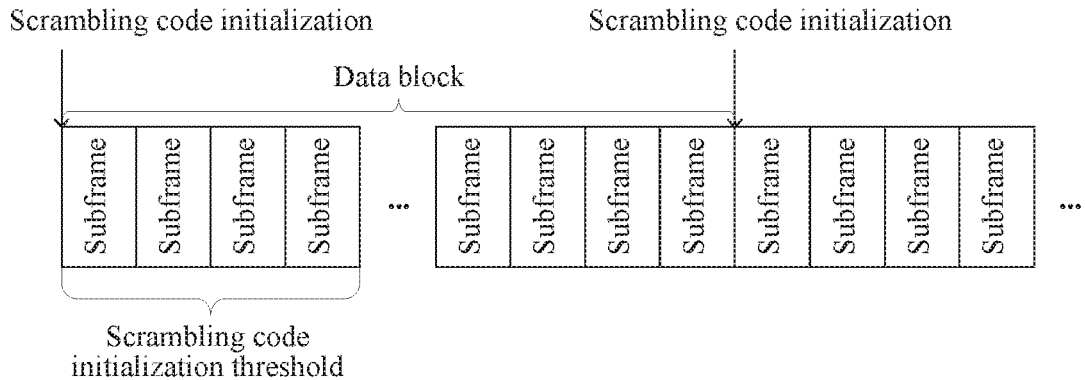
FIG. 3 is a schematic diagram of performing scrambling code initialization when a data block occupies a plurality of subframes in a data sending method according to Embodiment 2 of this application.

FIG. 3 is a schematic diagram of performing scrambling code initialization when a data block occupies a plurality of subframes in a data sending method according to Embodiment 2 of this application. Optionally, the data block occupies a plurality of subframes.

The performing scrambling code initialization to generate a new scrambling code when an interval after previous scrambling code initialization of the data block is greater than or equal to a scrambling code initialization parameter threshold described above in S104 may include:

if a quantity of subframes occupied by the data block is greater than or equal to the scrambling code initialization parameter threshold, performing scrambling code initialization each time the data block is repeatedly sent, to generate the new scrambling code.

Specifically, if the quantity of subframes occupied by the data block, that is, the quantity of subframes corresponding to the length of the data block, is greater than or equal to the scrambling code initialization parameter threshold, each time the data block is repeatedly sent, the interval after previous scrambling code initialization of the data block is greater than or equal to the scrambling code initialization parameter threshold. Therefore, scrambling code initialization may be performed each time the data block is repeatedly sent.

Figure 4:
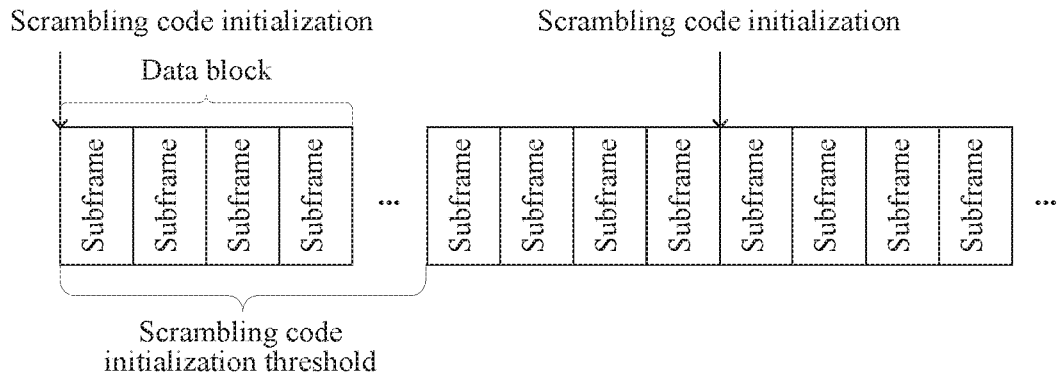
FIG. 4 is another schematic diagram of performing scrambling code initialization when a data block occupies a plurality of subframes in a data sending method according to Embodiment 2 of this application.

FIG. 4 is another schematic diagram of performing scrambling code initialization when a data block occupies a plurality of subframes in a data sending method according to Embodiment 2 of this application. Optionally, the performing scrambling code initialization to generate a new scrambling code when an interval after previous scrambling code initialization of the data block is greater than or equal to a scrambling code initialization parameter threshold described above in S104 may include:

if the quantity of subframes occupied by the data block is less than the scrambling code initialization parameter threshold, when a quantity of subframes after previous scrambling code initialization is greater than or equal to the scrambling code initialization threshold, performing scrambling code initialization for the data block.

Specifically, if the quantity of subframes corresponding to the quantity of subframes occupied by the data block is less than the scrambling code initialization parameter threshold, each time the data block is repeatedly sent, the interval after previous scrambling code initialization of the data block is less than the scrambling code initialization parameter threshold. Therefore, in the data sending method provided in this embodiment of this application, scrambling code initialization does not need to be performed each time the data block is repeatedly sent. Instead, when the data block is repeatedly sent for a plurality of times until the interval after previous scrambling code initialization of the data block is greater than or equal to the scrambling code initialization parameter threshold, scrambling code initialization is performed.

Optionally, the data block is an RMB, or a code block corresponding to a redundancy version (RV) of the RMB, and the RMB is a code block obtained after coding and rate matching are performed on to-be-sent data.

It should be noted that FIG. 3 and FIG. 4 are actually described by using a case in which the data block is an RMB. If the data block is a code block corresponding to an RV of an RMB, a schematic diagram of scrambling code initialization is similar to FIG. 3 and FIG. 4. Details are not described herein again.

Optionally, both the performing scrambling code initialization to generate a scrambling code described above in S101, and the performing scrambling code initialization to generate a scrambling code described above in S104 may include:

performing scrambling code initialization by using the following formula (1):

$$c_{init} = n_{RNTI} \cdot 2^{14} + A \cdot 2^9 + N_{ID}^{cell} \quad \text{formula (1),}$$

where $c_{init}$ is a scrambling code, $n_{RNTI}$ is a radio network temporary identifier identifying a terminal, A is a variable value and indicates the ninth to the thirteenth bits of bits that are in ascending order, and $N_{ID}^{cell}$ is a cell identity number.

Optionally, A is obtained by using any one of the following formula (2) to formula (7):

where q remains 0 or 1, or is $$A = q \cdot 2^4 + \left\{ \left[ SFN + \left\lfloor \frac{n_s}{2} \right\rfloor \right] \mathrm{mod} 16 \right\}, \quad \text{formula (2)}$$

obtained by performing negation on a previous value each time scrambling code initialization is performed:

$$A = q \cdot 2^4 + \left\{ \left[ SFN + \left\lfloor \frac{n_s}{2} \right\rfloor + \#Rep \right] \mathrm{mod} 16 \right\}, \quad \text{formula (3)}$$

where q remains 0 or 1, or is obtained by performing negation on a previous value each time scrambling code initialization is performed;

$$A = q \cdot 2^4 + \left\{ \left[ \left\lfloor \frac{n_s}{2} \right\rfloor + \#Rep \right] \mathrm{mod} 16 \right\}, \quad \text{formula (4)}$$

where q remains 0 or 1, or is obtained by performing negation on a previous value each time scrambling code initialization is performed;

$$A = \left[ SFN + \left\lfloor \frac{n_s}{2} \right\rfloor \right] \mathrm{mod} 32 \quad \text{formula (5)}$$

$$A = \left[ SFN + \left\lfloor \frac{n_s}{2} \right\rfloor + \#Rep \right] \mathrm{mod} 32; \text{ and} \quad \text{formula (6)}$$

$$A = \left[ \left\lfloor \frac{n_s}{2} \right\rfloor + \#Rep \right] \mathrm{mod} 32. \quad \text{formula (7)}$$

In the foregoing formulas. SFN indicates a system frame number, $n_s$ indicates a number of a corresponding timeslot in which the data block is repeatedly sent currently, # Rep indicates a repetition sequence number corresponding to current repeated sending of the data block, $\lfloor \cdot \rfloor$ indicates rounding down, and mod indicates modulo.

The data sending method provided in Embodiment 2 of this application may be described as a plurality of data sending methods for a data block of one subframe and a data block of a plurality of subframes, so that the data sending method can implement interference randomization when a data block of one subframe or a data block of a plurality of subframes is sent, can further ensure that a receive-end device can perform processing such as frequency offset estimation by using the repeatedly sent data block, ensure accuracy of data transmission between a transmit-end device and a receive-end device, and improve data transmission efficiency.

Figure 5:
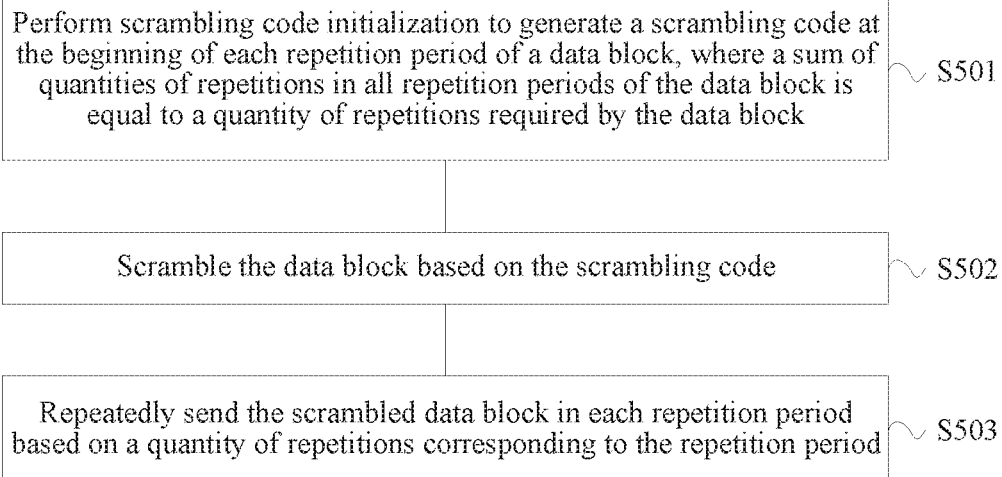
FIG. 5 is a flowchart of a data sending method according to Embodiment 3 of this application.

Embodiment 3 of this application further provides a data sending method. FIG. 5 is a flowchart of a data sending method according to Embodiment 3 of this application. As shown in FIG. 5, the method may include:

S501: Perform scrambling code initialization to generate a scrambling code at the beginning of each repetition period of a data block, where a sum of quantities of repetitions in all repetition periods of the data block is equal to a quantity of repetitions required by the data block.

S502: Scramble the data block based on the scrambling code.

It should be noted that a specific implementation of S502 may be similar to an implementation process of S102 in the foregoing embodiment. For specifics, refer to the foregoing embodiment. Details are not described herein again.

S503: Repeatedly send the scrambled data block in each repetition period based on a quantity of repetitions corresponding to the repetition period.

In the data sending method provided in Embodiment 3 of this application, scrambling code initialization is performed to generate the scrambling code at the beginning of each repetition period of the data block, where the sum of the quantities of repetitions in all the repetition periods of the data block is equal to the quantity of repetitions required by the data block, the data block is scrambled based on the scrambling code, and the scrambled data block is repeatedly sent in each repetition period based on the quantity of repetitions corresponding to the repetition period. Because scrambling code initialization does not need to be performed in each subframe, the data sending method provided in this embodiment of this application can further ensure that a receive-end device can perform processing such as frequency offset estimation by using the repeatedly sent data block, ensure accuracy of data transmission between a transmit-end device and a receive-end device, and improve data transmission efficiency while implementing interference randomization.

Optionally, the data block includes a plurality of sub-blocks, and each sub-block corresponds to at least one subframe. The data block may occupy a plurality of subframes.

Optionally, all the repetition periods include at least one repetition period.

Optionally, the performing scrambling code initialization at the beginning of each repetition period of a data block in S501 in the method may include:

performing scrambling code initialization at the beginning of each repetition period, to obtain a scrambling code corresponding to the repetition period.

Optionally, the scrambling the data block based on the scrambling code described above in S502 may include:

separately scrambling a plurality of sub-blocks of the data block based on the scrambling code corresponding to the repetition period.

Optionally, the repeatedly sending the scrambled data block in each repetition period based on a quantity of repetitions corresponding to the repetition period described above in S503 may include:

repeatedly sending the plurality of scrambled sub-blocks sequentially in each repetition period based on the quantity of repetitions corresponding to the repetition period.

Specifically, if the data block includes M sub-blocks, the quantity of repetitions corresponding to each repetition period may be, for example, N. In each repetition period, a first sub-block may be repeatedly sent for N times first, and then a second sub-block may be repeatedly sent for N times, and so on, until a last sub-block is repeatedly sent for N times.

For example, the data block includes a plurality of sub-blocks, the data block has one repetition period, and a quantity of repetitions corresponding to the repetition period is equal to the quantity of repetitions required by the data block. FIG. 6 is a schematic diagram of performing scrambling code initialization in a data sending method according to Embodiment 3 of this application. As shown in FIG. 6, in the method, a transmit-end device may perform scrambling code initialization at the beginning of the repetition period, that is, before the data block is transmitted for the first time.

For example, if the data block includes a plurality of sub-blocks, the data block has a plurality of repetition periods, and a sum of quantities of repetitions corresponding to the plurality of repetition periods is equal to the quantity of repetitions required by the data block. FIG. 7 is another schematic diagram of performing scrambling code initialization in a data sending method according to Embodiment 3 of this application. As shown in FIG. 7, in the method, the transmit-end device may perform scrambling code initialization at the beginning of each of the plurality of repetition periods, to obtain a scrambling code corresponding to each repetition period, so that different repetition periods correspond to different scrambling codes, and a same repetition period corresponds to one scrambling code.

Optionally, the data block is an RMB, the RMB is a code block obtained after coding and rate matching are performed on to-be-sent data, and the RMB includes code blocks corresponding to at least two RVs.

Each sub-block corresponds to a subframe or an RV.

Specifically, if each sub-block corresponds to one subframe, and the data block has one repetition period, the data block may be sent in a subframe repetition sending manner. If the data block has a plurality of repetition periods, the data block is sent in a cyclic subframe repetition sending manner.

If each sub-block corresponds to one RV, and the data block has one repetition period, the data block is sent in an RV repetition sending manner. If all the repetition periods of the data block include a plurality of repetition periods, the data block is sent in a cyclic RV repetition sending manner.

It should be noted that a specific implementation of performing scrambling code initialization in S501 of this data sending method may be similar to the specific implementation of performing scrambling code initialization in S101 of the data sending method provided in the foregoing embodiment. Details are not described again.

In the data sending method provided in Embodiment 3 of this application, scrambling code initialization may be performed at the beginning of each repetition period of the data block, so that when a data block of a plurality of subframes is sent in the data sending method, different repetition periods have different scrambling codes. Therefore, interference randomization can be implemented. In addition, a same scrambling code is used in a same repetition period. Therefore, the method can further ensure that a receive-end device can perform processing such as frequency offset estimation by using the repeatedly sent data block, ensure accuracy of data transmission between a transmit-end device and a receive-end device, and improve data transmission efficiency.

Embodiment 4 of this application further provides a data sending method. FIG. 8 is a flowchart of a data sending method according to Embodiment 4 of this application. As shown in FIG. 8, the method may include:

S801: Determine a bandwidth parameter based on a subcarrier spacing, where the bandwidth parameter is a quantity of subcarriers.

Specifically, in S801, a bandwidth parameter corresponding to the subcarrier spacing may be determined as the bandwidth parameter based on the subcarrier spacing and a preset correspondence between the subcarrier spacing and the bandwidth parameter. The bandwidth parameter may be a quantity of subcarriers corresponding to the transmit-end device. The subcarrier corresponding to the transmit-end device may be, for example, a usable subcarrier of the transmit-end device in a network system of the transmit-end device.

S802: Determine transmit power based on the bandwidth parameter.

Optionally, in S802, the transmit power may be determined based on the bandwidth parameter by using the following formula (8):

$$P(i) = \min\left\{\begin{array}{l} P_{MAX}(i), \\ 10\log_{10}(M(i)) + P(j) + \alpha(j) \cdot PL + \Delta(i) + f(i) \end{array}\right\} \quad \text{formula (8)}$$

M(i) may be the bandwidth parameter, P(i) is the transmit power, $P_{MAX}(i)$ is preset maximum transmit power. P(j) is target receive power of the receive-end device, α(j) is a preset path loss compensation coefficient, $\alpha_c(j)$ may be less than 1, $PL_c$ is path loss power, $\Delta_{TF,c}(i)$ is compensation power corresponding to an MCS, and $f_c(i)$ is a power adjustment corresponding to closed-loop power control.

S803: Send a data block on the subcarrier by using the transmit power.

Optionally, the determining a bandwidth parameter based on a subcarrier spacing in S801 of the method described above in this embodiment may include:

if the subcarrier spacing is a first spacing, determining a ratio of the first spacing to a second spacing as the bandwidth parameter, where the second spacing is greater than the first spacing.

Specifically, because the data sending method provided in the embodiments of this application may be applied to any network system such as NB-IOT in an LTE communications system, the first spacing may be a subcarrier spacing corresponding to the network system such as the NB-IOT in the LTE communications system. The second spacing may be a subcarrier spacing corresponding to the LTE communications system.

For example, the first spacing may be 3.75 kHz. and the second spacing may be 15 kHz.

Optionally, the sending a data block on the subcarrier by using the transmit power described above in S803 may include:

sending the data block on a single subcarrier of subcarriers between which the subcarrier spacing is the first spacing by using the transmit power.

Specifically, the transmit-end device may transmit the data block on a single carrier of subcarriers between which the subcarrier spacing is 3.75 kHz by using the transmit power. In other words, the transmit-end device may perform transmission on a single carrier transmission manner whose subcarrier spacing is 3.75 kHz.

Alternatively, the determining a bandwidth parameter based on a subcarrier spacing described above in S801 may include:

if the subcarrier spacing is a second spacing, determining a quantity of subcarriers between which the subcarrier spacing is the second spacing as the bandwidth parameter.

Specifically, the second spacing may be a subcarrier spacing corresponding to the LTE communications system.

Optionally, the sending a data block on the subcarrier by using the transmit power described above in S803 may include:

sending the data block on at least one of subcarriers between which the subcarrier spacing is the second spacing by using the transmit power.

Specifically, the transmit-end device may transmit the data block on a single carrier of subcarriers between which the subcarrier spacing is 15 kHz by using the transmit power, or may transmit the data block on a plurality of subcarriers between which the subcarrier spacing is 15 kHz.

For example, the second spacing may be 15 kHz, and the quantity of subcarriers that are spaced by the second spacing is 1, 3, 6, or 12. To be specific, the transmit-end device may transmit the data block on a single carrier of subcarriers between which the subcarrier spacing is 15 kHz by using the transmit power, may transmit the data block on three subcarriers between which the subcarrier spacing is 15 kHz by using the transmit power, may transmit the data block on six subcarriers between which the subcarrier spacing is 15 kHz by using the transmit power, or may transmit the data block on 12 subcarriers between which the subcarrier spacing is 15 kHz by using the transmit power.

To be specific, the transmit-end device may perform transmission in a single-carrier transmission manner whose subcarrier spacing is 15 kHz, a three-carrier transmission manner whose subcarrier spacing is 15 kHz, a six-carrier transmission manner whose subcarrier spacing is 15 kHz, a 12-carrier transmission manner whose subcarrier spacing is 15 kHz. and the like.

Therefore, the determining a bandwidth parameter based on a subcarrier spacing described in S801 of the foregoing embodiment may include:

determining, based on a transmission manner of the transmit-end device, a subcarrier spacing corresponding to the transmit-end device, and determining the bandwidth parameter based on the subcarrier spacing.

Specifically, the transmit-end device may determine, by using a preset correspondence table of a transmission manner and a bandwidth parameter, the subcarrier spacing corresponding to the transmit-end device, and determine the bandwidth parameter based on the subcarrier spacing. The preset correspondence table of a transmission manner and a bandwidth parameter may be, for example, the following Table 1:

TABLE 1

| Transmission manner | $M_{PUSCHc}$ (i) |
|---|---|
| Single-carrier transmission manner whose subcarrier spacing is 3.75 kHz | ¼ |
| Single-carrier transmission manner whose subcarrier spacing is 15 kHz | 1 |
| Three-carrier transmission manner whose subcarrier spacing is 15 kHz | 3 |
| Six-carrier transmission manner whose subcarrier spacing is 15 kHz | 6 |
| 12-carrier transmission manner whose subcarrier spacing is 15 kHz | 12 |

Embodiment 5 of this application further provides a data sending method. FIG. 9 is a flowchart of a data sending method according to Embodiment 5 of this application. As shown in FIG. 9, the method may include:

S901: Determine transmit power based on a preset quantity of repetitions and a preset modulation and coding scheme (MCS).

Specifically, the preset quantity of repetitions may be a quantity of times of repeated sending that is of a data block and that corresponds to a transmit-end device, and the preset MCS may be an MCS corresponding to the transmit-end device.

S902: Repeatedly send a data block by using the transmit power and the preset quantity of repetitions.

Optionally, the determining transmit power based on a preset quantity of repetitions and a preset MCS described above in S901 may include:

if a preset quantity of times of repeated sending is greater than or equal to a quantity of repetitions corresponding to the preset MCS, determining maximum transmit power as the transmit power.

Specifically, each MCS may correspond to a threshold of a quantity of repetitions, and different MCSs may correspond to different quantities of repetitions. The quantity of repetitions corresponding to the preset MCS may be a threshold of a quantity of times of repeated sending that is of the data block and that corresponds to the transmit-end device. The maximum transmit power may be maximum transmit power such as $P_{MAX}(i)$ corresponding to a preset power control policy of the transmit-end device.

Alternatively, the determining transmit power based on a preset quantity of repetitions and a preset MCS described above in S901 includes:

determining a bit rate based on a preset quantity of times of repeated sending and the preset MCS; and if the bit rate is less than or is equal to a preset bit rate value, determining maximum transmit power as the transmit power.

In the data sending method provided in Embodiment 5 of this application, the transmit power may be determined based on the preset quantity of repetitions and the preset modulation and coding scheme MCS, and the data block is repeatedly sent by using the transmit power and the preset quantity of repetitions, so that the receive-end device can better receive the data block, and coverage of sending the data block is expanded.

Figure 10:
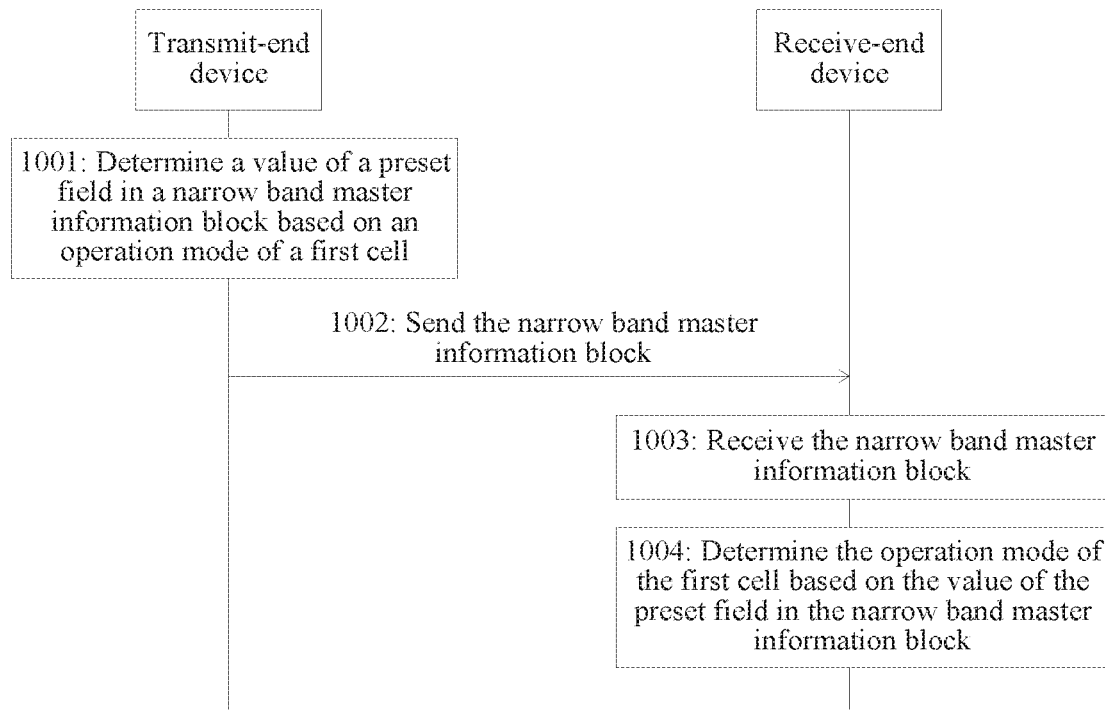
FIG. 10 is a flowchart of a data transmission method according to Embodiment 6 of this application.

Embodiment 6 of this application further provides a data transmission method. FIG. 10 is a flowchart of a data transmission method according to Embodiment 6 of this application. As shown in FIG. 10, the method may include:

S1001: Determine a value of a preset field in a narrow band master information block (NB-MIB) based on an operation mode of a first cell.

The narrow band master information block may be a master information block in narrow band Internet of Thing. The narrow band Internet of Thing requires only a minimum frequency spectrum of 180 kHz for networking.

S1002: Send the narrow band master information block.

Specifically, in S1002, the narrow band master information block may be sent by using a broadcast channel.

S1003: Receive the narrow band master information block.

S1004: Determine the operation mode of the first cell based on the value of the preset field in the narrow band master information block.

In the method provided in Embodiment 6, S1001 and S1002 may be performed by a network device such as a base station, and S1003 and S1004 may be performed by a terminal.

Optionally, the determining a value of a preset field in a narrow band master information block based on an operation mode of a first cell described above in S1001 includes:

if the operation mode of the first cell is a standalone operation mode, configuring the value of the preset field to a first value; or if the operation mode of the first cell is a guard-band operation mode, configuring the value of the preset field to a second value, where the first value is different from the second value.

Specifically, if the operation mode of the cell, that is, the first cell of the transmit-end device is the standalone operation mode, the value of the preset field may be configured to the first value such as 00. A frequency spectrum resource of a network of the first cell is different from a frequency spectrum resource corresponding to the second cell, and networking may be independently performed for the network of the first cell such as narrow band Internet of Thing by using a separate frequency spectrum. The frequency spectrum may come from a carrier of 200 kHz obtained by division in an existing GSM network, or a scattered frequency spectrum.

If the operation mode of the cell, that is, the first cell of the transmit-end device is a guard-band operation mode, the value of the preset field may be configured to the second value such as 01. The frequency spectrum resource of the network of the first cell is a frequency spectrum resource in a guard bandwidth of the second cell. For example, networking is performed for narrow band Internet of Thing by using a frequency spectrum of a guard bandwidth of a frequency spectrum resource in an LTE network. For example, an LTE carrier of 10 MHz has a guard band of 500 kHz at each of two ends of a frequency spectrum, and each guard band may provide at least a frequency spectrum of 180 kHz for narrow band Internet of Thing.

Optionally, the determining a value of a preset field in a narrow band master information block based on an operation mode of a first cell described above in S1001 includes:

if the operation mode of the first cell is an in-band operation mode, and a quantity of antenna ports of a narrow band reference signal of the first cell is the same as a quantity of antenna ports of a cell-specific reference signal of the second cell, configuring the value of the preset field to a third value, where the third value may be, for example, 10.

Alternatively, the determining a value of a preset field in a narrow band master information block based on an operation mode of a first cell described above in S1001 includes:

if the operation mode of the first cell is an in-band operation mode, and a quantity of antenna ports of the first cell is different from a quantity of antenna ports of a second cell, configuring the value of the preset field to a fourth value, where the fourth value may be, for example, 11.

Optionally, the determining the operation mode of the first cell based on the value of the preset field in the narrow band master information block described above in S1004 includes:

if the value of the preset field is the first value, determining that the operation mode of the first cell is the standalone operation mode; or if the value of the preset field is the second value, determining that the operation mode of the first cell is the guard-band operation mode; or Optionally, the determining the operation mode of the first cell based on the value of the preset field in the narrow band master information block described above in S1004 includes:

if the value of the preset field is the third value, and the quantity of antenna ports of the first cell is the same as the quantity of antenna ports of the second cell, determining that the operation mode of the first cell is the in-band operation mode.

Optionally, the determining the operation mode of the first cell based on the value of the preset field in the narrow band master information block described above in S1004 includes:

if the value of the preset field is the fourth value, and the quantity of antenna ports of the first cell is different from the quantity of antenna ports of a second cell, determining that the operation mode of the first cell is an in-band operation mode.

Specifically, if the value of the preset field is the third value or the fourth value, it may be determined that the operation mode corresponding to the transmit-end device is the in-band operation mode. In other words, the frequency spectrum resource of the network of the first cell is some frequency spectrum resources of in-band resources of the second cell. For example, networking is performed for narrow band Internet of Thing by using one or more physical resource blocks (PRB) of 180 kHz in an LTE frequency spectrum.

In a network access process, a terminal in narrow band Internet of Thing needs to read a narrow band master information block periodically broadcast on a narrow band Internet of Thing broadcast channel (Narrow Band-Physical Broadcast Channel. NB-PBCH), to obtain a key system parameter. The operation mode is a parameter. Because key parameters in different operation modes are not completely the same, a relatively desirable practice is that how to interpret all other parameters than the operation mode in the NB-MIB is determined based on a value of the parameter of the operation mode.

If narrow band Internet of Thing is in the in-band operation mode, some symbol resources in a PRB used for the narrow band Internet of Thing are occupied by an LTE cell, and cannot be used by UE in the narrow band Internet of Thing. In this case, the UE in the narrow band Internet of Thing further needs to read a quantity of antenna ports of a reference signal of a corresponding LTE cell from the NB-MIB, to determine a resource already occupied by the cell-specific reference signal of the LTE cell.

A quantity of antenna ports corresponding to a narrow band reference signal of a narrow band cell in narrow band Internet of Thing may be 1 or 2, and may be obtained by a terminal from the NB-MIB on the narrow band Internet of Thing broadcast channel. A correspondence between a quantity of antenna ports corresponding to a cell-specific reference signal of an LTE cell and a quantity of antenna ports corresponding to a narrow band reference signal of a narrow band cell may be shown in the following Table 2.

TABLE 2

| Cell-specific reference signal | Quantity of antenna ports | | |
|---|---|---|---|
| Cell-specific reference signal of an LTE cell | 1 | 2 | 4 |
| Narrow band reference signal of a narrow band cell | 1 | 2 | 2 |

It can be learned from Table 2 that when the quantity of antenna ports corresponding to the narrow band reference signal of the narrow band cell is known, the terminal in the narrow band Internet of Thing may know, based on whether the quantity of antenna ports corresponding to the narrow band reference signal of the narrow band cell is the same as the quantity of antenna ports corresponding to the cell-specific reference signal of the LTE cell, the quantity of antenna ports corresponding to the cell-specific reference signal of the LTE cell. This information may be indicated by one bit. However, because this information needs to exist only when narrow band Internet of Thing is in the in-band operation mode, a more efficient encoding manner is encoding this information and the operation mode of the narrow band Internet of Thing together. For example, in two bits of the operation mode, 00 indicates the standalone operation mode, 01 indicates the guard-band operation mode, 10 indicates the in-band operation mode and that the quantities of antenna ports corresponding to the narrow band reference signal of the narrow band cell and the cell-specific reference signal of the LTE cell are the same, and 11 indicates the in-band operation mode and that the quantities of antenna ports corresponding to the narrow band reference signal of the narrow band cell and the cell-specific reference signal of the LTE cell are different.

In the data transmission method provided in Embodiment 6 of this application, the operation mode of the first cell may be determined based on the value of the preset field in the narrow band master information block NB-MIB, where the NB-MIB is sent by a network device in the first cell.

Figure 11:
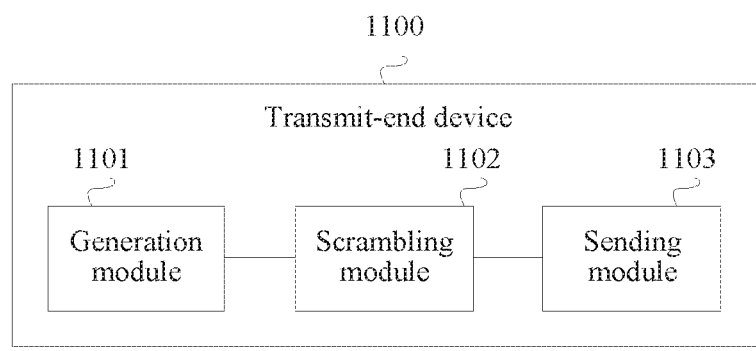
FIG. 11 is a schematic structural diagram of a transmit-end device according to Embodiment 7 of this application.

Embodiment 7 of this application provides a transmit-end device. FIG. 11 is a schematic structural diagram of a transmit-end device according to Embodiment 4 of this application. As shown in FIG. 11, the transmit-end device 1100 may include: a generation module 1101, a scrambling module 1102, and a sending module 1103.

The generation module 1101 and the scrambling module 1102 may be implemented by using a processor in the transmit-end device 1100. The sending module 1103 may be implemented by using a transmitter device or a transmit antenna in the transmit-end device 1100.

The generation module 1101 is configured to perform scrambling code initialization to generate a scrambling code.

The scrambling module 1102 is configured to scramble a data block based on the scrambling code.

The sending module 1103 is configured to repeatedly send the scrambled data block.

The generation module 1101 is further configured to perform scrambling code initialization to generate a new scrambling code when an interval after previous scrambling code initialization of the data block is greater than or equal to a preset scrambling code initialization parameter threshold.

The scrambling module 1102 is further configured to scramble the data block again based on the generated new scrambling code.

The sending module 1103 is further configured to repeatedly send the data block scrambled again.

The transmit-end device provided in Embodiment 7 of this application may be configured to execute any data sending method described above in Embodiment 1 or 2. Beneficial effects thereof are similar to those in the foregoing embodiment. Details are not described herein again.

Optionally, the interval is indicated by a quantity of time or resource units.

Optionally, the interval is indicated by a quantity of subframes.

Optionally, the data block occupies at least one subframe; and the generation module 1101 is further configured to: if a quantity of subframes occupied by the data block is greater than or equal to the scrambling code initialization parameter threshold, perform scrambling code initialization each time the data block is repeatedly sent, to generate the new scrambling code.

Optionally, if the data block occupies at least one subframe, the generation module 1101 is further configured to: if a quantity of subframes occupied by the data block is less than the scrambling code initialization parameter threshold, perform scrambling code initialization to generate the new scrambling code when a quantity of subframes after previous scrambling code initialization is greater than or equal to the scrambling code initialization parameter threshold.

Optionally, the data block is a rate matched block RMB, or a code block corresponding to a redundancy version RV of the RMB, and the RMB is a code block obtained after coding and rate matching are performed on to-be-sent data.

Optionally, the generation module 1101 is further configured to perform scrambling code initialization by using the following formula (1):

$$c_{init}=n_{RNTI}\cdot 2^{14}+A\cdot 2^9+N_{ID}^{cell} \quad \text{formula (1),}$$

where $c_{init}$ is a scrambling code, $n_{RNTI}$ is a radio network temporary identifier identifying a terminal. A is a variable value and indicates the ninth to the thirteenth bits of bits that are in ascending order, and $N_{ID}^{cell}$ is a cell identity number.

Optionally, the generation module 1101 is further configured to obtain A by using the following formula (2):

$$A = q\cdot 2^4 + \left\{\left[SFN + \left\lfloor\frac{n_s}{2}\right\rfloor\right]\mathrm{mod}16\right\}, \quad \text{formula (2)}$$

where q remains 0 or 1, or is obtained by performing negation on a previous value each time scrambling code initialization is performed; and SFN indicates a system frame number, $n_s$ indicates a number of a corresponding timeslot in which the data block is repeatedly sent currently, $\lfloor\cdot\rfloor$ indicates rounding down, and mod indicates modulo.

Alternatively, the generation module 1101 may be further configured to obtain A by using the following formula (3):

$$A = q\cdot 2^4 + \left\{\left[SFN + \left\lfloor\frac{n_s}{2}\right\rfloor + \#Rep\right]\mathrm{mod}16\right\}, \quad \text{formula (3)}$$

where q remains 0 or 1, or is obtained by performing negation on a previous value each time scrambling code initialization is performed; and SFN indicates a system frame number, $n_s$ indicates a number of a corresponding timeslot in which the data block is repeatedly sent currently, $\lfloor\cdot\rfloor$ indicates rounding down, # Rep indicates a repetition sequence number corresponding to current repeated sending of the data block, and mod indicates modulo.

Alternatively, the generation module 1101 may be further configured to obtain A by using the following formula (4):

$$A = q\cdot 2^4 + \left\{\left[\left\lfloor\frac{n_s}{2}\right\rfloor + \#Rep\right]\mathrm{mod}16\right\}, \quad \text{formula (4)}$$

where q remains 0 or 1, or is obtained by performing negation on a previous value each time scrambling code initialization is performed: and $n_s$ indicates a number of a corresponding timeslot in which the data block is repeatedly sent currently, $\lfloor\cdot\rfloor$ indicates rounding down, # ReP indicates a repetition sequence number corresponding to current repeated sending of the data block, and mod indicates modulo.

Alternatively, the generation module 1101 may be further configured to obtain A by using the following formula (5):

$$A = \left[SFN + \left\lfloor\frac{n_s}{2}\right\rfloor\right]\mathrm{mod}32, \quad \text{formula (5)}$$

where

SFN indicates a system frame number, $n_s$ indicates a number of a corresponding timeslot in which the data block is repeatedly sent currently, $\lfloor\cdot\rfloor$ indicates rounding down, and mod indicates modulo.

Alternatively, the generation module 1101 may be further configured to obtain A by using the following formula (6):

$$A = \left[SFN + \left\lfloor\frac{n_s}{2}\right\rfloor + \#Rep\right]\mathrm{mod}32, \quad \text{formula (6)}$$

where

SFN indicates a system frame number, n indicates a number of a corresponding timeslot in which the data block is repeatedly sent currently, $\lfloor\cdot\rfloor$ indicates rounding down, # Rep indicates a repetition sequence number corresponding to current repeated sending of the data block, and mod indicates modulo.

Alternatively, the generation module 1101 may be further configured to obtain A by using the following formula (7):

$$A = \left[\left\lfloor\frac{n_s}{2}\right\rfloor + \#Rep\right]\mathrm{mod}32, \quad \text{formula (7)}$$

where $n_s$ indicates a number of a corresponding timeslot in which the data block is repeatedly sent currently, # Rep indicates a repetition sequence number corresponding to current repeated sending of the data block, $\lfloor\cdot\rfloor$ indicates rounding down, and mod indicates modulo.

The transmit-end device provided in Embodiment 7 of this application may be configured to execute any data sending method described above in Embodiment 1 or 2. Beneficial effects thereof are similar to those in the foregoing embodiment. Details are not described herein again.

Figure 12:
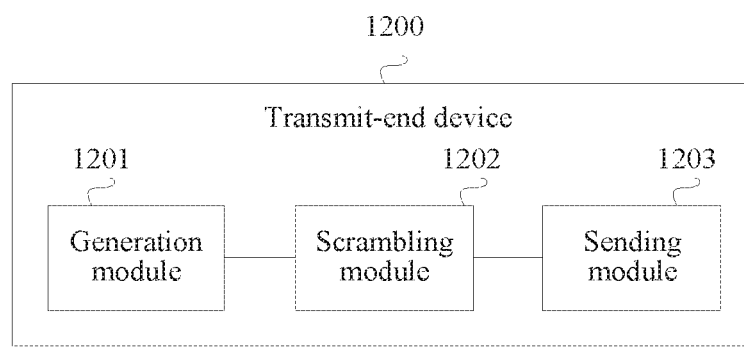
FIG. 12 is a schematic structural diagram of a transmit-end device according to Embodiment 8 of this application.

Embodiment 8 of this application further provides a transmit-end device. FIG. 12 is a schematic structural diagram of a transmit-end device according to Embodiment 5 of this application. As shown in FIG. 12, the transmit-end device 1200 may include: a generation module 1201, a scrambling module 1202, and a sending module 1203.

The generation module 1201 and the scrambling module 1202 may be implemented by using a processor in the transmit-end device 1200. The sending module 1203 may be implemented by using a transmitter device or a transmit antenna in the transmit-end device 1200.

The generation module 1201 is configured to perform scrambling code initialization to generate a scrambling code at the beginning of each repetition period of a data block, where a sum of quantities of repetitions in all repetition periods of the data block is equal to a quantity of repetitions required by the data block.

The scrambling module 1202 is configured to scramble a data block based on the scrambling code.

The sending module 1203 is configured to repeatedly send the scrambled data block in each repetition period based on a quantity of repetitions corresponding to the repetition period.

The transmit-end device provided in Embodiment 8 of this application may be configured to execute any data sending method described above in Embodiment 3. A specific implementation process and beneficial effects are similar to those in the foregoing embodiment. Details are not described herein again.

Optionally, the data block includes a plurality of sub-blocks, and each sub-block corresponds to at least one subframe.

Optionally, the data block is a rate matched block RMB, the RMB is a code block obtained after coding and rate matching are performed on to-be-sent data, and the RMB includes code blocks corresponding to at least two RVs; and each sub-block corresponds to a subframe or a redundancy version RV.

Optionally, all the repetition periods include at least one repetition period.

The transmit-end device provided in Embodiment 8 of this application may be configured to execute any data sending method described above in Embodiment 3. A specific implementation process and beneficial effects are similar to those in the foregoing embodiment. Details are not described herein again.

Figure 13:
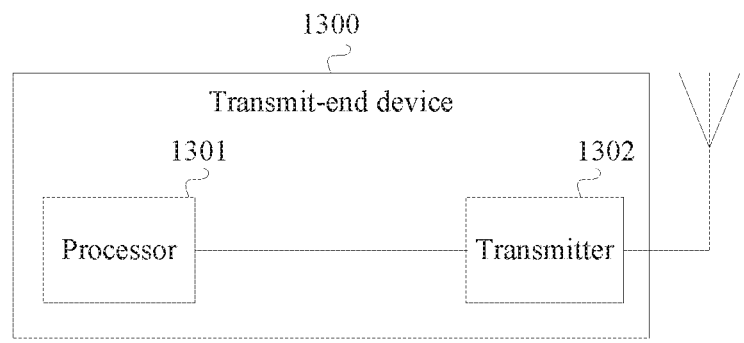
FIG. 13 is a schematic structural diagram of a transmit-end device according to Embodiment 9 of this application.

Embodiment 9 of this application further provides a transmit-end device. FIG. 13 is a schematic structural diagram of a transmit-end device according to Embodiment 9 of this application. As shown in FIG. 13, the transmit-end device 1300 may include: a processor 1301 and a transmitter 1302.

The processor 1301 may be an integrated circuit chip having an instruction and data execution capability and a signal processing capability. In an implementation process, the steps of the foregoing methods may be performed by a hardware integrated logic circuit in the processor 1306 or an instruction in a form of software. The processor 1301 may be specifically a central processing unit (CPU), a digital signal processor (DSP), an application-specific integrated circuit (ASIC), a field-programmable gate array (FPGA) or other programmable logical devices, a discrete gate or transistor logical device, a discrete hardware component, or the like. The processor may implement or execute the methods, steps, and logical block diagrams disclosed in the embodiments of this application. A general-purpose processor may be a microprocessor or the processor may be any conventional processor or the like.

The transmitter 1302 may also be implemented by using a transmitter device or a transmit antenna.

The processor 1301 is configured to: perform scrambling code initialization to generate a scrambling code, and scramble a data block based on the scrambling code.

The transmitter 1302 may be configured to repeatedly send the scrambled data block.

The processor 1301 is further configured to: perform scrambling code initialization to generate a new scrambling code when an interval after previous scrambling code initialization of the data block is greater than or equal to a preset scrambling code initialization parameter threshold; and scramble the data block again based on the generated new scrambling code.

The transmitter 1302 may be configured to repeatedly send the data block scrambled again.

Optionally, the interval is indicated by a quantity of time or resource units.

Optionally, the interval is indicated by a quantity of subframes.

Optionally, the data block occupies at least one subframe; and the processor 1301 is further configured to: if a quantity of subframes occupied by the data block is greater than or equal to the scrambling code initialization parameter threshold, perform scrambling code initialization each time the data block is repeatedly sent, to generate the new scrambling code.

Optionally, if the data block occupies at least one subframe:

the processor 1301 is further configured to: if a quantity of subframes occupied by the data block is less than the scrambling code initialization parameter threshold, perform scrambling code initialization to generate the new scrambling code when a quantity of subframes after previous scrambling code initialization is greater than or equal to the scrambling code initialization parameter threshold.

Optionally, the data block is a rate matched block RMB, or a code block corresponding to a redundancy version RV of the RMB, and the RMB is a code block obtained after coding and rate matching are performed on to-be-sent data.

Optionally, the processor 1301 is further configured to perform scrambling code initialization by using the following formula (1):

$$c_{init}=n_{RNTI} \cdot 2^{14}+A \cdot 2^9+N_{ID}^{cell} \qquad \text{formula (1)},$$

where $c_{init}$ is a scrambling code, $n_{RNTI}$ is a radio network temporary identifier identifying a terminal, A is a variable value and indicates the ninth to the thirteenth bits of bits that are in cell ascending order, and $N_{ID}^{cell}$ is a cell identity number.

Optionally, the processor 1301 may be configured to obtain A by using the following formula (2):
where $$A = q \cdot 2^4 + \left\{ \left[ SFN + \left\lfloor \frac{n_s}{2} \right\rfloor \right] \bmod 16 \right\}, \qquad \text{formula (2)}$$

q remains 0 or 1, or is obtained by performing negation on a previous value each time scrambling code initialization is performed; and SFN indicates a system frame number, $n_s$ indicates a number of a corresponding timeslot in which the data block is repeatedly sent currently, $\lfloor \cdot \rfloor$ indicates rounding down, and mod indicates modulo.

Alternatively, the processor 1301 may be configured to obtain A by using the following formula (3):
where $$A = q \cdot 2^4 + \left\{ \left[ SFN + \left\lfloor \frac{n_s}{2} \right\rfloor + \#Rep \right] \bmod 16 \right\}, \qquad \text{formula (3)}$$

q remains 0 or 1, or is obtained by performing negation on a previous value each time scrambling code initialization is performed; and SFN indicates a system frame number, $n_s$ indicates a number of a corresponding timeslot in which the data block is repeatedly sent currently, $\lfloor \cdot \rfloor$ indicates rounding down. #ReP indicates a repetition sequence number corresponding to current repeated sending of the data block, and mod indicates modulo.

Alternatively, the processor 1301 may be configured to obtain A by using the following formula (4):
where $$A = q \cdot 2^4 + \left\{ \left[ \left\lfloor \frac{n_s}{2} \right\rfloor + \#Rep \right] \bmod 16 \right\}, \qquad \text{formula (4)}$$

q remains 0 or 1, or is obtained by performing negation on a previous value each time scrambling code initialization is performed; and $n_s$ indicates a number of a corresponding timeslot in which the data block is repeatedly sent currently, $\lfloor \cdot \rfloor$ indicates rounding down, # Rep indicates a repetition sequence number corresponding to current repeated sending of the data block, and mod indicates modulo.

Alternatively, the processor 1301 may be configured to obtain A by using the following formula (5):

$$A = \left[ SFN + \left\lfloor \frac{n_s}{2} \right\rfloor \right] \bmod 32, \quad \text{formula (5)}$$

where

SFN indicates a system frame number, $n_s$ indicates a number of a corresponding timeslot in which the data block is repeatedly sent currently, $\lfloor \cdot \rfloor$ indicates rounding down, and mod indicates modulo.

Alternatively, the processor 1301 may be configured to obtain A by using the following formula (6):

$$A = \left[ SFN + \left\lfloor \frac{n_s}{2} \right\rfloor + \#Rep \right] \bmod 32, \quad \text{formula (6)}$$

where

SFN indicates a system frame number, $n_s$ indicates a number of a corresponding timeslot in which the data block is repeatedly sent currently, $\lfloor \cdot \rfloor$ indicates rounding down, # Rep indicates a repetition sequence number corresponding to current repeated sending of the data block, and mod indicates modulo.

Alternatively, the processor 1301 may be configured to obtain A by using the following formula (7):

$$A = \left[ \left\lfloor \frac{n_s}{2} \right\rfloor + \#Rep \right] \bmod 32, \quad \text{formula (7)}$$

where $n_s$ indicates a number of a corresponding timeslot in which the data block is repeatedly sent currently, # Rep indicates a repetition sequence number corresponding to current repeated sending of the data block, $\lfloor \cdot \rfloor$ indicates rounding down, and mod indicates modulo.

The transmit-end device provided in Embodiment 9 of this application may be configured to execute any data sending method described above in Embodiment 1 or 2. Beneficial effects thereof are similar to those in the foregoing embodiment. Details are not described herein again.

Figure 14:
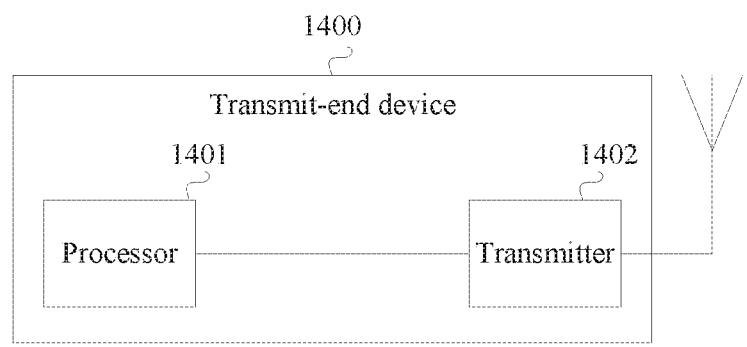
FIG. 14 is a schematic structural diagram of a transmit-end device according to Embodiment 10 of this application.

Embodiment 10 of this application further provides a transmit-end device. FIG. 14 is a schematic structural diagram of a transmit-end device according to Embodiment 10 of this application. As shown in FIG. 14, the transmit-end device 1400 may include: a processor 1401 and a transmitter 1402.

The processor 1401 may be an integrated circuit chip having an instruction and data execution capability and a signal processing capability. In an implementation process, the steps of the foregoing methods may be performed by a hardware integrated logic circuit in the processor 1406 or an instruction in a form of software. The processor 1401 may be specifically a CPU, a DSP, an ASIC, an FPGA or other programmable logical devices, a discrete gate or transistor logical device, or a discrete hardware component. The processor may implement or execute the methods, steps, and logical block diagrams disclosed in the embodiments of this application. A general-purpose processor may be a microprocessor or the processor may be any conventional processor or the like.

The transmitter 1402 may also be implemented by using a transmitter device or a transmit antenna.

The processor 1401 is further configured to: perform scrambling code initialization to generate a scrambling code at the beginning of each repetition period of a data block, where a sum of quantities of repetitions in all repetition periods of the data block is equal to a quantity of repetitions required by the data block; and scramble the data block based on the scrambling code.

The transmitter 1402 is configured to repeatedly send the scrambled data block in each repetition period based on a quantity of repetitions corresponding to the repetition period.

Optionally, the data block includes a plurality of sub-blocks, and each sub-block corresponds to at least one subframe.

Optionally, the data block is a rate matched block RMB, the RMB is a code block obtained after coding and rate matching are performed on to-be-sent data, and the RMB includes code blocks corresponding to at least two RVs; and each sub-block corresponds to a subframe or a redundancy version RV.

Optionally, all the repetition periods include at least one repetition period.

The transmit-end device provided in Embodiment 10 of this application may be configured to execute any data sending method described above in Embodiment 3. Beneficial effects thereof are similar to those in the foregoing embodiment. Details are not described herein again.

Figure 15:
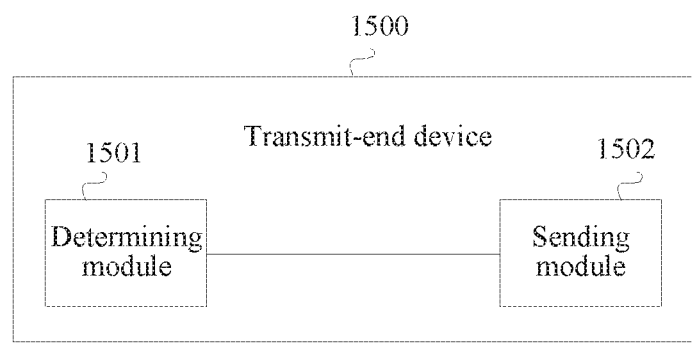
FIG. 15 is a schematic structural diagram of a transmit-end device according to Embodiment 11 of this application.

Embodiment 11 of this application further provides a transmit-end device. FIG. 15 is a schematic structural diagram of a transmit-end device according to Embodiment 11 of this application. As shown in FIG. 15, the transmit-end device 1500 may include:

a determining module 1501, configured to: determine a bandwidth parameter based on a subcarrier spacing, where the bandwidth parameter is a quantity of subcarriers, and determine transmit power based on the bandwidth parameter; and a sending module 1502, configured to send a data block on the subcarrier by using the transmit power.

Optionally, the determining module 1501 is further configured to: if the subcarrier spacing is a first spacing, determine a ratio of the first spacing to a second spacing as the bandwidth parameter, where the second spacing is greater than the first spacing.

The sending module 1502 is further configured to send the data block on a single subcarrier of subcarriers between which the subcarrier spacing is the first spacing by using the transmit power.

Optionally, the first spacing is 3.75 kHz. and the second spacing is 15 kHz.

Optionally, the determining module 1501 is further configured to: if the subcarrier spacing is a second spacing, determine a quantity of subcarriers between which the subcarrier spacing is the second spacing as the bandwidth parameter, and the sending module 1502 is further configured to send the data block on at least one of subcarriers between which the subcarrier spacing is the second spacing by using the transmit power.

Optionally, the second spacing is 15 kHz, and the quantity of subcarriers that are spaced by the second spacing is 1, 3, 6, or 12.

The transmit-end device provided in Embodiment 11 of this application may execute the data sending method provided in Embodiment 4. An implementation process and beneficial effects are similar to those in the foregoing embodiment. Details are not described herein again.

Figure 16:
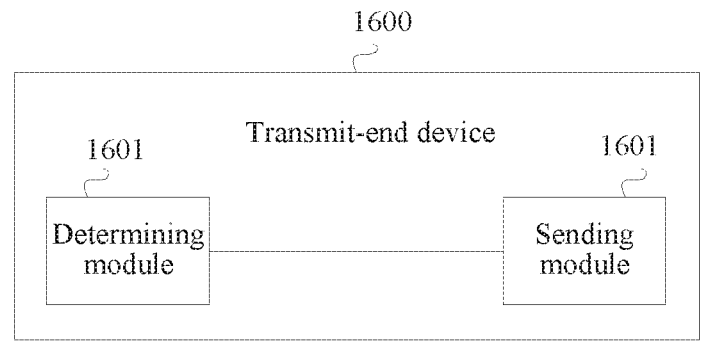
FIG. 16 is a schematic structural diagram of a transmit-end device according to Embodiment 12 of this application.

Embodiment 12 of this application further provides a transmit-end device. FIG. 16 is a schematic structural diagram of a transmit-end device according to Embodiment 12 of this application. As shown in FIG. 16, the transmit-end device 1600 may include:

a determining module 1601, configured to determine transmit power based on a preset quantity of repetitions and a preset MCS; and a sending module 1602, configured to repeatedly send a data block by using the transmit power and the preset quantity of repetitions.

Optionally, the determining module 1601 is further configured to: if a preset quantity of times of repeated sending is greater than or equal to a quantity of repetitions corresponding to the preset MCS, determine maximum transmit power as the transmit power.

Alternatively, the determining module 1601 is further configured to: determine a bit rate based on a preset quantity of times of repeated sending and the preset MCS; and if the bit rate is less than or is equal to a preset bit rate value, determine maximum transmit power as the transmit power.

The transmit-end device provided in Embodiment 12 of this application may execute the data sending method provided in Embodiment 5. An implementation process and beneficial effects are similar to those in the foregoing embodiment. Details are not described herein again.

Figure 17:
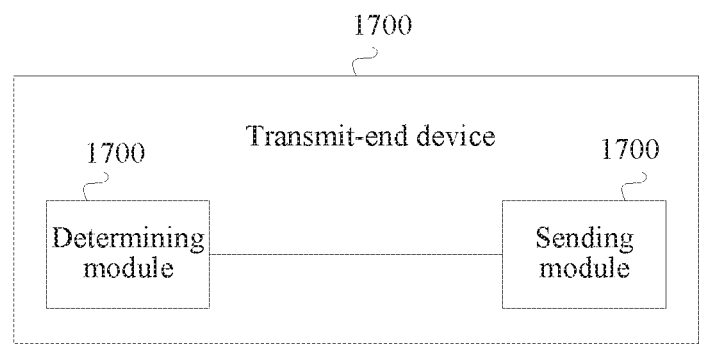
FIG. 17 is a schematic structural diagram of a transmit-end device according to Embodiment 13 of this application.

Embodiment 13 of this application further provides a transmit-end device. FIG. 17 is a schematic structural diagram of a transmit-end device according to Embodiment 13 of this application. As shown in FIG. 17, the transmit-end device 1700 may include:

a determining module 1701, configured to determine a value of a preset field in a narrow band master information block based on an operation mode of a first cell; and a sending module 1702, configured to send the narrow band master information block.

Optionally, the determining module 1701 is further configured to: if the operation mode of the first cell is a standalone operation mode, configure the value of the preset field to a first value; or if the operation mode of the first cell is a guard-band operation mode, configure the value of the preset field to a second value, where the first value is different from the second value.

Optionally, the determining module 1701 is further configured to: if the operation mode of the first cell is an in-band operation mode, and a quantity of antenna ports of the first cell is the same as a quantity of antenna ports of a second cell, configure the value of the preset field to a third value.

Optionally, the determining module 1702 is further configured to: if the operation mode of the first cell is an in-band operation mode, and a quantity of antenna ports of the first cell is different from a quantity of antenna ports of a second cell, configure the value of the preset field to a fourth value.

Figure 18:
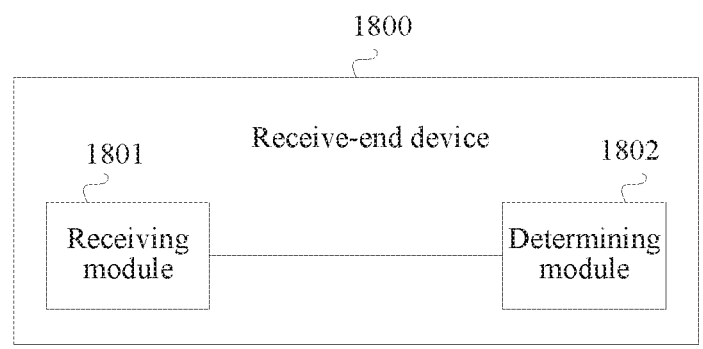
FIG. 18 is a schematic structural diagram of a receive-end device according to Embodiment 13 of this application.

Embodiment 13 of this application further provides a receive-end device. FIG. 18 is a schematic structural diagram of a receive-end device according to Embodiment 13 of this application. As shown in FIG. 18, the transmit-end device 1800 may include:

a receiving module 1801, configured to receive a narrow band master information block; and a determining module 1802, configured to determine an operation mode of a first cell based on a value of a preset field in the narrow band master information block.

Optionally, the determining module 1801 is further configured to: if the value of the preset field is a first value, determine that the operation mode of the first cell is a standalone operation mode; or if the value of the preset field is a second value, determine that the operation mode of the first cell is a guard-band operation mode.

Optionally, the determining module 1801 is further configured to: if the value of the preset field is a third value, and a quantity of antenna ports of the first cell is the same as a quantity of antenna ports of a second cell, determine that the operation mode of the first cell is an in-band operation mode.

Optionally, the determining module 1801 is further configured to: if the value of the preset field is a fourth value, and a quantity of antenna ports of the first cell is different from a quantity of antenna ports of a second cell, determine that the operation mode of the first cell is an in-band operation mode.

The transmit-end device and the receive-end device provided in Embodiment 13 of this application may execute the data transmission method provided in Embodiment 6. An implementation process and beneficial effects are similar to those in the foregoing embodiment. Details are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

The invention claimed is:

1. A data sending method, comprising:
   determining, a bandwidth parameter corresponding to a first subcarrier spacing, wherein the bandwidth parameter equals a ratio of the first subcarrier spacing to a second subcarrier spacing;
   determining a transmit power based on the bandwidth parameter; and
   sending a data block on a subcarrier of subcarriers with the first subcarrier spacing according to the transmit power.

2. The method according to claim 1, wherein the second subcarrier spacing is greater than the first subcarrier spacing.

3. The method according to claim 2, wherein the first subcarrier spacing is 3.75 kilohertz (kHz), and wherein the second subcarrier spacing is 15 kHz.

4. A transmit-end device, comprising:
   a memory storage comprising instructions;

a processor in communication with the memory storage and configured to execute the instructions to cause the transmit-end device to:
  determine a bandwidth parameter corresponding to a first subcarrier spacing, wherein the bandwidth parameter equals a ratio of the first subcarrier spacing to a second subcarrier spacing;
  determine a transmit power based on the bandwidth parameter; and
  send a data block on a subcarrier of subcarriers with the first subcarrier spacing according to the transmit power.

5. The transmit-end device according to claim 4, wherein the second subcarrier spacing is greater than the first subcarrier spacing.

6. The transmit-end device according to claim 5, wherein the first subcarrier spacing is 3.75 kilohertz (kHz), and wherein the second subcarrier spacing is 15 kHz.

7. A transmit-end device, comprising:
a memory storage comprising instructions;
a processor in communication with the memory storage and configured to execute the instructions to cause the transmit-end device to:
  determine a bandwidth parameter corresponding to a first subcarrier spacing, wherein the bandwidth parameter equals a quantity of subcarriers with the first subcarrier spacing;
  determine a transmit power based on the bandwidth parameter; and
  send a data block on subcarrier of subcarriers with the first subcarrier spacing according to the transmit power.

8. The transmit-end device according to claim 7, wherein the first subcarrier spacing is 15 kilohertz (kHz), and wherein the quantity of subcarriers is 1, 3, 6 or 12.

9. A transmit-end device, comprising:
a memory storage comprising instructions;
a processor in communication with the memory storage and configured to execute the instructions to cause the transmit-end device to:
  determine a bandwidth parameter corresponding to a subcarrier spacing based on a correspondence between a transmission manner and the bandwidth parameter, wherein the transmission manner indicates the subcarrier spacing and a quantity of subcarriers with the subcarrier spacing;
  determine a transmit power based on the bandwidth parameter; and
  send a data block on subcarrier of subcarriers with the subcarrier spacing according to the transmit power.

10. The transmit-end device according to claim 9, wherein the bandwidth parameter equals 1/4 in case that the transmission manner indicates the subcarrier spacing is 3.75 kilohertz (kHz) and the quantity of subcarriers with the subcarrier spacing is 1.

11. The transmit-end device according to claim 9, wherein the bandwidth parameter equals 1 in case that the transmission manner indicates the subcarrier spacing is 15 kilohertz (kHz) and the quantity of subcarriers with the subcarrier spacing is 1.

12. The transmit-end device according to claim 9, wherein the bandwidth parameter equals 3 in case that the transmission manner indicates the subcarrier spacing is 15 kilohertz (kHz) and the quantity of subcarriers with the subcarrier spacing is 3.

13. The transmit-end device according to claim 9, wherein the bandwidth parameter equals 6 in case that the transmission manner indicates the subcarrier spacing is 15 kilohertz (kHz) and the quantity of subcarriers with the subcarrier spacing is 6.

14. The transmit-end device according to claim 9, wherein the bandwidth parameter equals 12 in case that the transmission manner indicates the subcarrier spacing is 15 kilohertz (kHz) and the quantity of subcarriers with the subcarrier spacing is 12.

15. A data sending method, comprising:
determining a bandwidth parameter corresponding to a subcarrier spacing based on a correspondence between a transmission manner and the bandwidth parameter, wherein the transmission manner indicates the subcarrier spacing and a quantity of subcarriers with the subcarrier spacing;
determining a transmit power based on the bandwidth parameter; and
sending a data block on a subcarrier of subcarriers with the subcarrier spacing according to the transmit power.

16. The method according to claim 15, wherein the bandwidth parameter equals 1/4 in case that the transmission manner indicates the subcarrier spacing is 3.75 kilohertz (kHz) and the quantity of subcarriers with the subcarrier spacing is 1.

17. The method according to claim 15, wherein the bandwidth parameter equals 1 in case that the transmission manner indicates the subcarrier spacing is 15 kilohertz (kHz) and the quantity of subcarriers with the subcarrier spacing is 1.

18. The method according to claim 15, wherein the bandwidth parameter equals 3 in case that the transmission manner indicates the subcarrier spacing is 15 kilohertz (kHz) and the quantity of subcarriers with the subcarrier spacing is 3.

19. The method according to claim 15, wherein the bandwidth parameter equals 6 in case that the transmission manner indicates the subcarrier spacing is 15 kilohertz (kHz) and the quantity of subcarriers with the subcarrier spacing is 6.

20. The method according to claim 15, wherein the bandwidth parameter equals 12 in case that the transmission manner indicates the subcarrier spacing is 15 kilohertz (kHz) and the quantity of subcarriers with the subcarrier spacing is 12.

21. A data sending method, comprising:
determining a bandwidth parameter corresponding to a first subcarrier spacing, wherein the bandwidth parameter equals a quantity of subcarriers with the first subcarrier spacing;
determining a transmit power based on the bandwidth parameter; and
sending a data block on a subcarrier of subcarriers with the first subcarrier spacing according to the transmit power.

22. The method according to claim 21, wherein the first subcarrier spacing is 15 kilohertz (kHz), and wherein the quantity of subcarriers is 1, 3, 6, or 12.

* * * * *

UNITED STATES PATENT AND TRADEMARK OFFICE
CERTIFICATE OF CORRECTION

PATENT NO. : 11,160,032 B2
APPLICATION NO. : 16/725317
DATED : October 26, 2021
INVENTOR(S) : Yang et al.

Page 1 of 1

It is certified that error appears in the above-identified patent and that said Letters Patent is hereby corrected as shown below:

On the Title Page

Page 2, (56) References Cited, Column 2, Line 13, "2007/0087749 A1 4/2007 Lonescu" should read "2007/0087749 A1 4/2007 Ionescu"

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*